US006785727B1

(12) United States Patent
Yamazaki

(10) Patent No.: US 6,785,727 B1
(45) Date of Patent: Aug. 31, 2004

(54) IMAGE PROCESSOR FOR PROCESSING RESERVATION AND INFORMATION PROCESSOR FOR REQUESTING RESERVATION

(75) Inventor: Masahito Yamazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/470,207

(22) Filed: Dec. 22, 1999

(30) Foreign Application Priority Data

Dec. 24, 1998 (JP) ............................................ 10-367995
Dec. 7, 1999 (JP) ............................................ 11-347347

(51) Int. Cl.[7] .............................................. G06F 15/16
(52) U.S. Cl. .................................... 709/229; 358/1.13
(58) Field of Search ........................ 709/229, 100–103, 709/227–228, 107; 370/395.4; 358/1.1–1.18

(56) References Cited

U.S. PATENT DOCUMENTS

| 5,535,009 | A | * | 7/1996 | Hansen ....................... 358/401 |
| 5,754,744 | A | * | 5/1998 | Matsumoto et al. ........ 358/1.13 |
| 5,940,582 | A | * | 8/1999 | Akabori et al. ............. 358/1.13 |
| 5,970,218 | A | * | 10/1999 | Mullin et al. ............... 358/1.15 |
| 5,982,994 | A | * | 11/1999 | Mori et al. .................. 358/1.15 |
| 6,026,258 | A | * | 2/2000 | Fresk et al. .................. 358/296 |
| 6,125,249 | A | * | 9/2000 | Ootsuka et al. ............. 358/296 |
| 6,292,267 | B1 | * | 9/2001 | Mori et al. .................. 358/1.15 |
| 6,348,972 | B1 | * | 2/2002 | Taniguchi et al. .......... 358/1.15 |
| 6,421,135 | B1 | * | 7/2002 | Fresk et al. ................. 358/1.13 |

FOREIGN PATENT DOCUMENTS

JP        08-335147      * 12/1996        ............. G06F/3/12

* cited by examiner

*Primary Examiner*—Marc D. Thompson
(74) *Attorney, Agent, or Firm*—Fitzpatrick, Cella, Harper & Scinto

(57) ABSTRACT

To provide an image processor making it possible to reserve a printer even if no job is generated and to be shared by a plurality of users in order to preferentially and securely process a job of a reserver in a reserved time zone, which accepts a reservation of a job while no job is received, secures resources used for the reserved job, and controls the reserved job by using the resources secured by the securing means.

56 Claims, 18 Drawing Sheets

FIG. 16

| | Canon LASER SHOOT LB-450 | | |
|---|---|---|---|
| OPTION HELP | | | |
| PRINTER STATUS | JOB LIST IN SPOOLER | JOB LIST IN PRINTER | PORT |

DOCUMENT : lalala  PRIORITY : 1

OWNER : DDD  COLOR : MONOCHROME

SIZE : 32KB  BOTH SIDE : NONE

| DOCUMENT | STATUS | OWNER | SIZE |
|---|---|---|---|
| ○ ugauga | PROCESSING | AAA | 32 |
| ○ hogehoge | WAITING | BBB | 24 |
| ○ mogra | WAITING | CCC | 32 |
| ▲ lalala | WAITING | DDD | 32 |
| ○ taptap | | EEE | 24 |

SUSPEND
STOP PRINTING
CHANGE PRIORITY

| JOB NO. | QUEUE NO. | PRIORITY | USER NAME | FILE NAME | PARAMETER LIST HANDLE | STATUS |
|---|---|---|---|---|---|---|
| 1 | 1 | 3 | AAA | ugauga | 0x00abcdef | PROCESSING |
| 2 | 4 | 3 | BBB | hogehoge | 0x00fdecba | WAITING |
| 3 | 3 | 2 | CCC | mogera | 0x00654321 | WAITING |
| 4 | 2 | 1 | DDD | lalala | 0x00123456 | WAITING |
| 5 | 0 | 3 | EEE | taptap | 0x0013579b | RECEIVING |
| 0 | 0 | 0 | NULL | NULL | NULL | FREE |
| ... | ... | ... | ... | ... | ... | ... |

FIG. 18
| RESOURCE NAME | JOB NO. |
|---|---|
| A4 SUPPLY TRAY | 5 |
| A3 SUPPLY TRAY | NULL |
| A4 PAPER DECK | NULL |
| MANUAL SUPPLY PORT | 2 |
| EJECT TRAY | NULL |
| SUB EJECT TRAY | 2 |
1800
FIG. 20
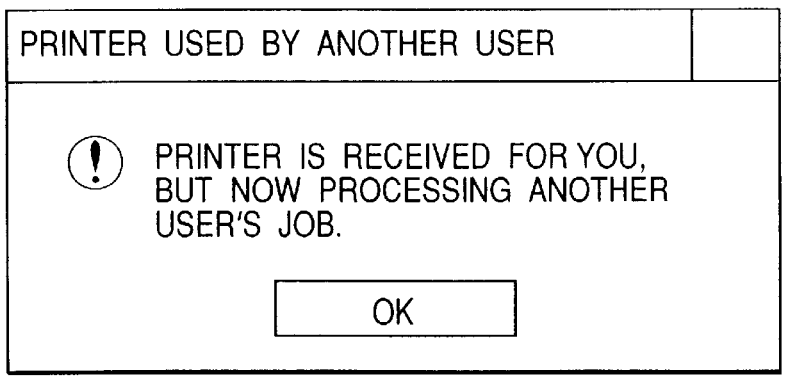
FIG. 21
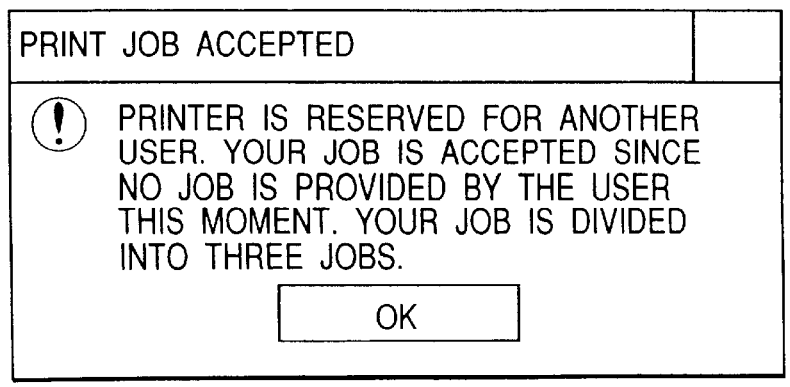

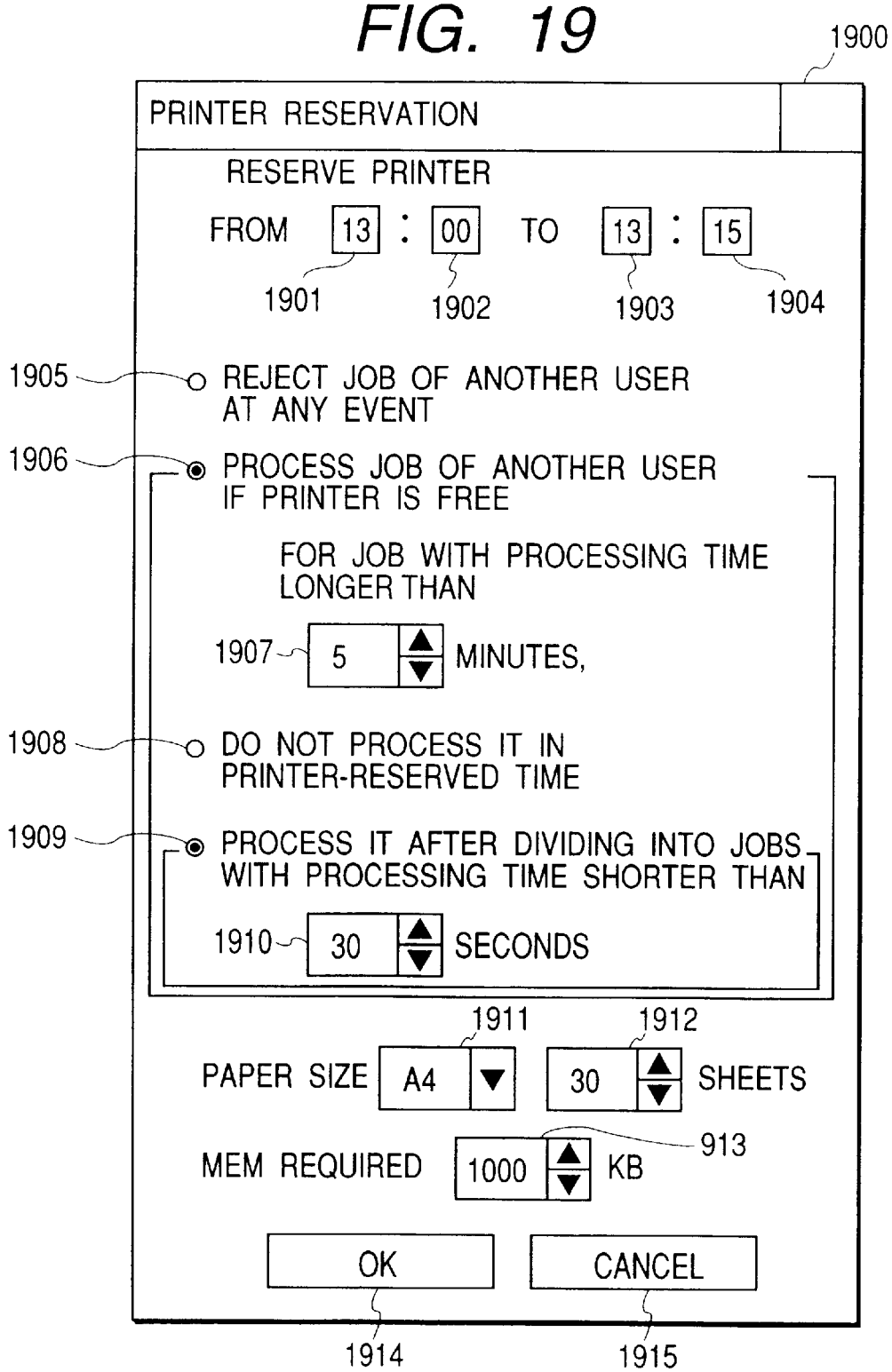

IMAGE PROCESSOR FOR PROCESSING RESERVATION AND INFORMATION PROCESSOR FOR REQUESTING RESERVATION

BACKGROUND OF THE INVENTION

1. Field of the Invention

The present invention relates to an image processor to be connected to a host computer through a bidirectional interface and its control method, a recording medium storing a control program for the image processor, an information processor and an information processing method, and a recording medium storing an information processing program.

2. Related Background Art

JP-A-8-335147 discloses a method for reserving print jobs and setting the priority of the jobs so that desired printing-out can be quickly executed.

This specification discloses an image printer which can be used as an image input unit (scanner) by connecting it with a computer (host computer), a printer for printing the print data supplied from the computer, or a copying machine. The image printer makes it possible to reserve or cancel the next print job even while a certain job (image reading or printing) is executed and process a job corresponding to the priority.

For example, the image printer has advantages that copying can be designated through an operation panel of the printer, a copying job can be realized when a print job supplied from the computer is completed while remote printing is performed from a computer, and thereby, a user does not have to wait to designate copying in front of the image printer until remote printing is performed.

However, in case of a conventional reservable image printer using the above method, it is possible to accept a plurality of jobs in parallel but it is impossible to reserve a printer when no job is generated. For example, under the state in which printing-out must be completed by a determined time, when the data for a document to be printed out or the like is unfinished yet in a host computer, it is impossible to reserve a printer and it is necessary that a job of an object to be printed is generated without any fail when the printer is reserved. That is, it is not considered to reserve a printer for the data to be prospectively finished from a host computer.

Moreover, because a conventional image printer always accepts jobs in parallel, it is impossible to use the printer so that it is used by a plurality of users in common depending on a time zone but it is used only by a specified user in a certain time zone.

Furthermore, a printer and a printing system are recently planned which starts printing at a designated time by designating a scheduled output time when designating the printing of a job generated by a host computer. In case of the above printing system, however, it is possible to only designate a scheduled output time when designating the printing of a finished job but a resource necessary for printing is not reserved. Therefore, an error of paper deficiency may occur at the scheduled output time and thus, secure printing-out is not assured at a reserved time.

SUMMARY OF THE INVENTION

The present invention is made to solve the above problems and its first object is to make it possible to reserve a printer even if a job is not generated.

It is a second object of the present invention to make it possible to securely process a reserved job by making it possible to reserve a resource used for the reserved job.

It is a third object of the present invention to make it possible to preferentially process a job of a reserver in a reserved time zone by making a specified user use a printer in a certain time zone and excluding jobs of other users.

To solve the above problems, the present invention uses an image processor shared by a plurality of users, comprising first setting means for reserving and setting a job-processing time zone, second setting means for setting a job control method in the reserved time zone, and job control means for processing a job of a reserver preferentially to other users in a set reserved time zone in accordance with the setting by the first and second setting means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 16 is a status monitor of an image processor displayed on a display unit of a host computer in the second embodiment of the present invention;

FIG. 17 is a diagrammed job table in the second embodiment of the present invention;

FIG. 18 is a diagrammed resource table in the second embodiment of the present invention;

FIG. 19 is an illustration showing a reservation dialog displayed at the host side when setting methods for time reservation and job control in the first embodiment of the present invention;

FIG. 20 is an illustration showing a dialog displayed on the screen of a host computer of a reserver to communicate the use of a printer by other user when processing a job other than a job of the reserver in a reserved time zone in the first embodiment of the present invention;

FIG. 21 is an illustration shown a dialog for communicating the division of a job, displayed on a screen of a host computer generating a divided job other than a job of a reserver in a reserved time zone in the first embodiment of the present invention;

DETAILED DESCRIPTION OF THE PREFERRED EMBODIMENTS

Embodiments of the present invention will be described below in detail by referring to the accompanying drawings.

Before describing the configuration of each embodiment of the present invention, an image process or to be applied to each embodiment of the present invention will be described.

First, a configuration of a laser-beam printer to be preferably applied to an image processor of the present invention is described below by referring to FIG. 1.

It is needless to say that image processors to which the present invention can be applied include not only electrophotographic printers such as a laser-beam printer and an LED (Light-Emitting Diode) printer but also other printing-type printers such as an ink-jet printer and a heat transfer printer.

Figure 1:
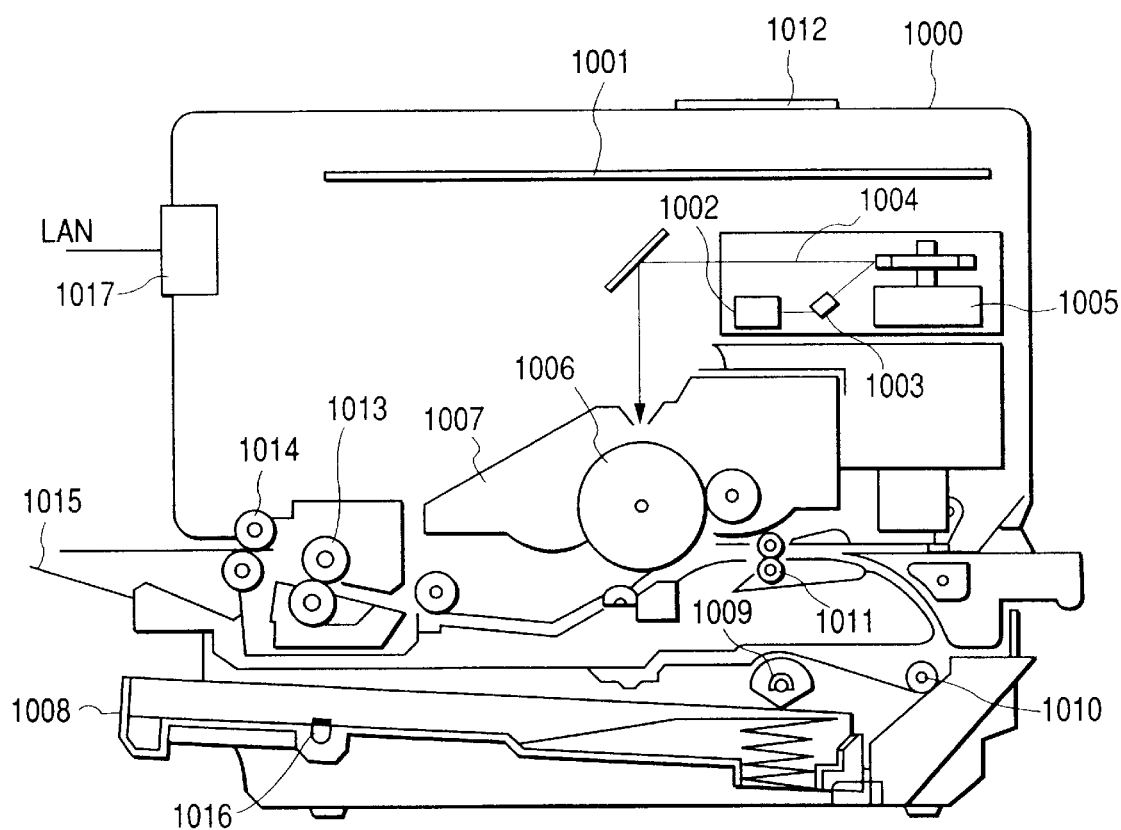
FIG. 1 is a longitudinal sectional view showing an internal configuration of a laser-beam printer as an example of an image processor to which the present invention can be applied.

FIG. 1 shows an internal structure of an image processor applicable to each embodiment of the present invent to be described later and the case of a laser-beam printer (LBP) (hereafter referred to as "printer") as an example.

In FIG. 1, symbol 1000 denotes a printer which inputs and stores printing information (such as character codes) and form information or a macro instruction supplied from a host computer (refer to FIG. 2) connected to a local area network (LAN) through a network board 1017, generates corresponding character patterns and form patterns in accordance with these pieces of information, and form an image on a recording material such as a recording sheet. Symbol 1012 denotes an operation panel on which switches for operations and LED indicators are arranged, and 1001 denotes a printer control unit for controlling the whole of the printer 1000 and analyzing character information and the like supplied from the host computer.

The control unit 1001 mainly converts character information into a video signal of a corresponding character pattern and outputs the video signal to a laser driver 1002. The laser driver 1002 is a circuit for driving a semiconductor laser 1003, which turns on/off a laser beam 1004 emitted from the semiconductor laser 1003 corresponding to the video signal input.

The laser beam 1004 is oscillated in rightward and leftward by a rotary polygon mirror 1005 to scan and expose the surface of an electrostatic drum 1006. Thereby, an electrostatic latent image is formed on the electrostatic drum 1006. The latent image is developed by a developing unit 1007 set around the electrostatic drum 1006 and then, transferred to a recording sheet, and a transferred toner image is fixed by being heated and pressed by a fixing unit 1013, and thereafter the recording sheet is ejected onto an ejected-sheet tray 1015 by ejected-sheet rollers 1014. A plurality of ejected-sheet trays 1015 may be used or a finisher (not illustrated) having the sorting, stapling, or punching function may be used.

The recording sheet normally uses a cut sheet. The cut recording sheet is stored in a sheet cassette 1008 provided for the printer 1000, taken into the printer 1000 by sheet feed rollers 1009 and carrying rollers 1010 and 1011, and fed to the electrostatic drum 1006. A plurality of sheet cassettes 1008 may be used for each sheet size, type of sheet, and purpose. Moreover, detection means 1016 is used which detects how many recording media are left in the sheet cassette 1008 serving as recording-medium holding means by a sensor. Furthermore, a both-side printer (not illustrated) may be included in the printer 1000.

A configuration of a composite unit suitable for an image processor of the present invention is described below by referring to FIG. 23.

Figure 23:
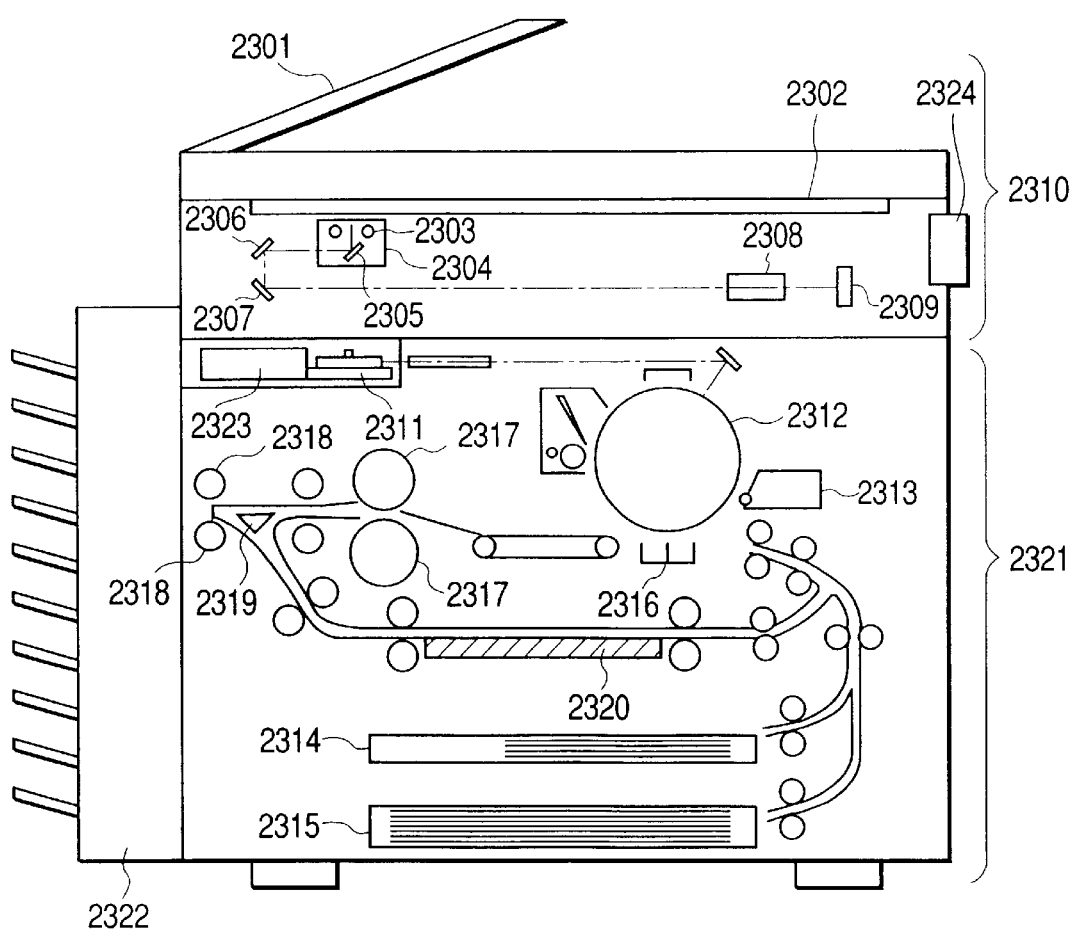
FIG. 23 is a longitudinal sectional view an internal configuration of a composite unit serving as an image processor to which the present invention can be applied.

FIG. 23 is a schematic block diagram for explaining a configuration of this type of the image processor that is constituted of a reader 2310 and a printer 2321. The configuration and operations will be described below.

A manuscript feeder 2301 of the reader 2310 is provided with an automatic manuscript-reading function for feeding manuscripts onto a platen glass 2302 one by one from the final page in order, reading the manuscripts, and thereafter ejecting the manuscripts on the platen glass 2302 onto the original manuscripts on the manuscript feeder 2301. Moreover, it is possible to detect the number of manuscripts by empty-reading manuscripts. When a manuscript is carried onto the platen glass 2302, a lamp 2303 is turned on, a scanner 2304 starts moving, and the manuscript is exposed and scanned. In this case, the light reflected from the manuscript is led to a CCD image sensor (hereafter referred to as CCD) 2309 by mirrors 2305, 2306, and 2307 and a lens 2308.

An image of the manuscript thus scanned is read by the CCD 2309. Video data output from the CCD 2309 is transferred to the printer 2321 after the predetermined processing. A laser driver 2323 of the printer 2321 drives a laser-beam emitter 2311 and makes the laser-beam emitter 2311 emit a laser beam corresponding to video data output from the reader 2310.

The laser beam is applied to a photosensitive drum 2312 and a latent image corresponding to the laser beam is formed on the photosensitive drum 2312. A developer is attached to the portion of the latent image on the photosensitive drum 2312 by a development counter 2313. Then, a recording sheet is carried to a transfer unit 2316 from either of cassettes 2314 and 2315 at a timing synchronizing with the start of irradiation with the laser beam to transfer the developer attached to the photosensitive drum 2312 to the recording sheet. The recording sheet with the developer on it is carried to a fixing unit 2317 and the developer is fixed to the recording sheet by the heat and pressure of the fixing unit 2317. The recording sheet passing through the fixing unit 2317 is ejected by ejection rollers 2318 and a sorter 2322 stores ejected recording sheets in each bottle to sort the recording sheets.

When sorting is not set, the sorter 2322 stores recording sheets in the uppermost bottle. When both-side recording is set, the sorter 2322 carries recording sheets up to the ejection rollers 2318 and then, reverse the rotational direction of the ejection rollers 2318 to lead the recording sheets to a sheet refeed path by a flapper 2319. When multiple recording is set, recording sheets are carried to the sheet refeed path by the flapper 2319 so that the recording sheets are not carried up to the ejection rollers 2318. The recording sheets led to the sheet refeed path are fed to the transfer unit 2316 at the above timing.

Moreover, an intermediate tray 2320 is set on the sheet refeed path, recording media (recording sheets) whose either-side printing is completed are successively stored in the intermediate tray 2320, a plurality of recording media stored in the intermediate tray are refed by reversing the sequence of storing the recording media in the intermediate tray after every either-side recording is completed, and remaining side is printed and ejected to the sorter 2322.

Thus, one side and both sides of the composite unit are printed. Moreover, the composite unit shown in FIG. 23 is provided with an extension board 2324. Because the extension board has functions of a printer board and a FAX board, the composite unit can be also used as a printer or FAX.

The printer board function of the extension board 2324 analyzes the print data received from a host computer through a network to develop the data into a bit map. The extension board 2324 supplies a bit-map-developed output image to the laser driver 2323 and the laser drive 2323 makes the laser-beam emitter 2311 emit a laser beam corresponding to the output image and executes the printing same as the above.

Moreover, the FAX function of the extension board 2324 realizes the communication with a host computer through a network and moreover, is connected to a public circuit and transceives FAX data. The FAX function includes a function of compressing an image read by the reader 2310 or data transmitted from and processed by a host computer in accordance with a predetermined compression method and FAX-transmitting the image or data through a public circuit and a function of printing the data FAX-received from a public circuit or transmitting the data to a predetermined host computer.

Furthermore, the extension board 2324 has a function of receiving a control code from a host computer, printing an image read by the reader 2310 in accordance with the control code, and outputting the image to a predetermined host computer and a function of processing an image read by the reader 2310 in accordance with a designation supplied from a not-illustrated operation panel of the image processor, outputting the image to a designated host computer, and FAX-transmitting the image to a designated place through a public circuit.

Figure 2:
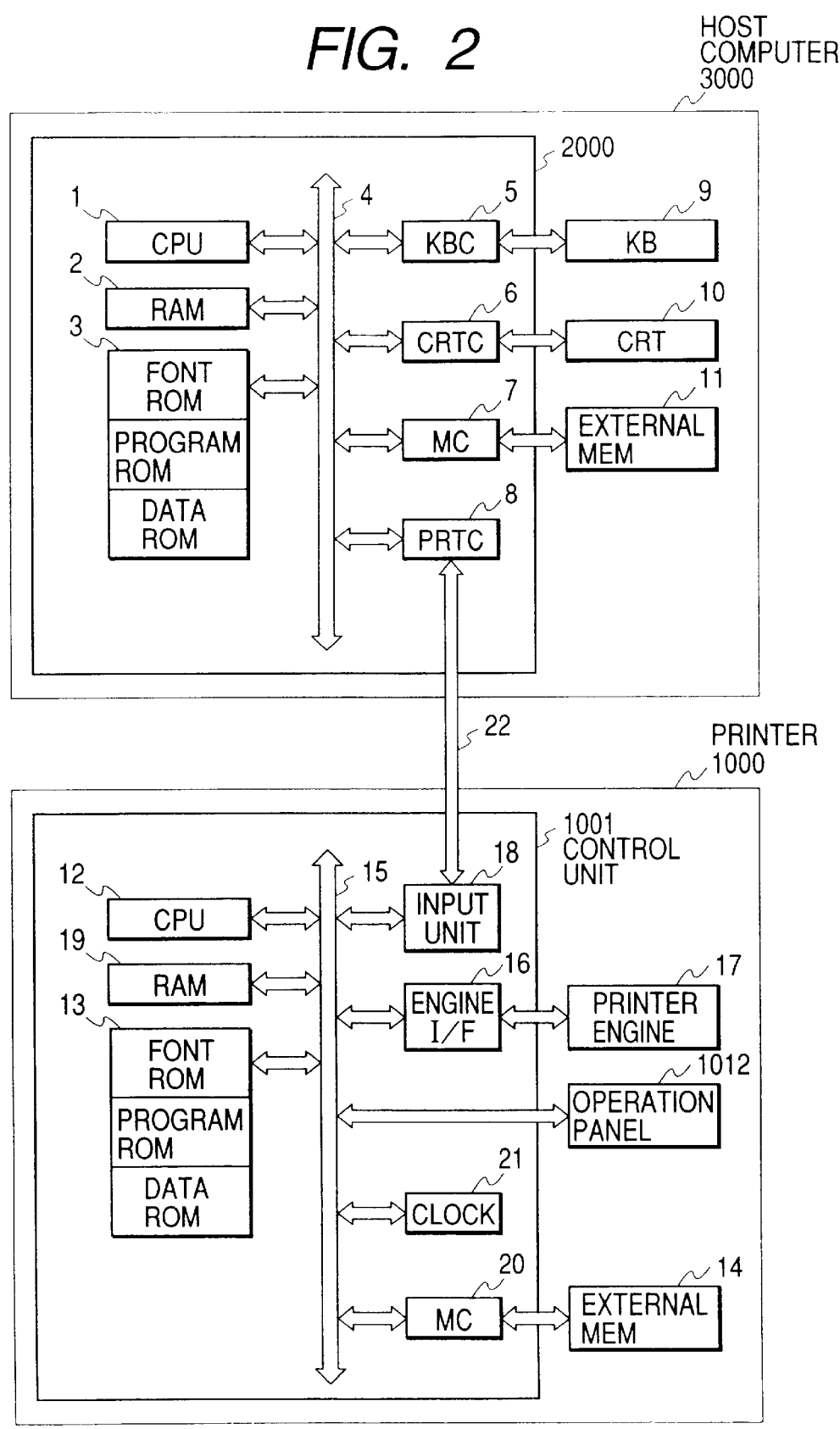
FIG. 2 is a block diagram showing a configuration of a printer control system in an embodiment of the present invention.

FIG. 2 shows a hardware configuration of a printer control system used for each embodiment of the present invention. Hereafter, a laser-beam printer (FIG. 1) will be described below as an example. It is needless to say that the present invention can be applied to a single unit, a system comprising a plurality of units, or a system in which processing is executed through a network such as LAN (Local Area Network) as long as functions of the present invention are executed. Moreover, the hardware configuration in FIG. 2 is the same as that of the composite unit shown in FIG. 23.

In FIG. 2, symbol 3000 denotes a host system comprising a host computer 2000, a keyboard 9, a CRT display 10, and an external memory 11 such as a hard disk (HD) or floppy disk (FD) for storing a printing control program, a boot program, various applications, font data, a user file, and an edition file of the present invention. The host computer 2000 is provided with a CPU (Central Processing Unit) 1 for processing a document containing graphs, images, characters, and tables (including spreadsheet) in accordance with a document processing program stored in a program ROM (also referred to as program storing area) in a ROM (Read Only Memory) and constituted so that the CPU 1 generally controls devices connected to a system device 4. Moreover, the CPU 1 generates print data in accordance with a control program (printing control program, transmission control program, or read control program) stored in an external memory 11.

Moreover, the control program of the CPU 1 is stored in the program ROM of the ROM 3 and font data used for the above document processing is stored in a font ROM (also referred to as font storing area) of the ROM 3.

Symbol 2 denotes a RAM (Random Access Memory) which functions as a main memory or work area of the CPU 1. Symbol 5 denotes a keyboard controller (KBC) which controls a key input from the keyboard 9 or a pointing device (not illustrated).

Symbol 6 denotes a CRT controller (CRTC) which controls displays of the CRT display (CRT) 10. Symbol 7 denotes a memory controller (MC) which controls access with the external memory 11. Symbol 8 denotes a printer controller (PRTC) which is connected to the printer 1000 through a predetermined bi-directionally-communicable medium 22 to control the communication with the printer 1000 serving as an image processor. It is also permitted to use the IEEE 1284.4 as a bidirectionally-communicable medium or it is also considered that the IEEE 1284.4 is connected through a network. Moreover, in case of the present invention, it is assumed that the image processor 1000 is shared by a plurality of users. Therefore, it is preferable that the medium 22 is a local area network (LAN).

Moreover, the CPU 1 executes the development (rasterization) of an outline font to a display information RAM set on, for example, the RAM 2 to make WYSIWYG (What You See Is What You get, an output displayed on a screen) possible on the CRT 10. Moreover, the CPU 1 opens various windows entered in accordance with commands designated by a mouse cursor (not illustrated) on the CRT 10 to execute various data processings.

Then, the configuration of the control system of the printer 1000 is described. The printer 1000 comprises a control unit 1001, a printer 17 (hereafter referred to as "printer engine 17"), an operation panel 1012, and an external memory 14. Symbol 12 denotes a printer CPU which generally controls the access with various devices connected to a system bus 15 in accordance with a control program of the present invention stored in the program ROM of the ROM 13 or a control program stored in the external memory 14 and outputs a video signal serving as output information to the printer engine 17 connected through a printer-engine interface 16.

Moreover, control programs of the CPU 12 shown by flow charts in FIGS. 3 and 7 to be mentioned later are stored in the program ROM of the ROM 13. Font data used to generate the above output information is stored in the font ROM of the ROM 13 and information used for a host computer is stored in the data ROM of the ROM 13 in the case of a printer having no external memory 14 such as a hard disk.

The CPU 12 realizes the communication with a host computer 2000 and is constituted so that the information in a printer can be communicated to a host computer 2000. Symbol 19 denotes a RAM functioning as a main memory or a work area of the CPU 12, which is constituted so that the memory capacity can be extended by an optional RAM (not illustrated) connected to an extended port. Moreover, the RAM 19 is used for an output-information developing area, environmental-data storing area, or NVRAM (Nonvolatile RAM).

Access of the external memory 14 such as a hard disk (HD) or IC card is controlled by a memory controller (MC) 20. The external memory 14 is connected as an option to store font data, an emulation program, and form data. Moreover, it is permitted to use one external memory 14 or more so that a plurality of external memories storing not only a built-in font but also an optional font card and a program for interpreting printer control languages different from each other in language system can be connected. Furthermore, it is permitted that the external memory 14 has an NVRAM (not illustrated) so as to store the printer-mode-setting information supplied from the operation panel 1012.

Symbol 21 denotes a built-in clock used to refer to the present time when executing a control program. In the case of the operation panel (operation unit) 1012 described for FIG. 1, switches for operations and LED indicators are arranged and connected with the CPU 12 through the system bus 15.

In case of embodiments of the present invention described below, when the printer control system thus constituted is shared by a plurality of users, the system makes it possible for a specified user to reserve a printer time, limits the processing of a print job of a non-reserver in a reserved time zone, and executes the control for preferentially processing a print job of a reserver.

Embodiments of the present invention will be described below.

First Embodiment

For the first embodiment of the present invention, a case is described in which a job of a party other than a reserver is rejected in a reserved time zone and only a print job of a reserver is quickly processed in a reserved time zone by estimating the required time of a job even before a reserved time and rejecting the processing of a job whose processing is not completed before the reserved time.

The print data generated by the host computer 2000 and to be processed by the printer 1000 serving as an image processor is assumed as a "print job." When a plurality of image processors 1000 (FIG. 23) are used, the processing when copy-designated in an input unit 18 (operation panel) of the image processor 1000 is referred to as "copy job," the processing when scan-designated in the input unit (reader 2324) so as to read a manuscript image and hold it in the external memory 14 is referred to as "scan job," the processing when designated so as to FAX-transmit a read image through a public circuit is referred to as "FAX-transmission job," the processing when designated so as to transmit a read image to the host computer 2000 through a network 22 is referred to as "push scan job," the processing for printing the data FAX-received through a public circuit is referred to as "FAX reception job," the processing for outputting the data FAX-received through a public circuit to the host computer 2000 is referred to as "FAX up job," the processing for scanning a manuscript image by the image processor 1000 and printing it by the printer engine 17 in accordance with an image read designation supplied from the host computer 2000 is referred to as "remote copy job," the processing for holding a read image in the external memory 14 of the image processor is referred to as "remote scan job," and the processing for transmitting a read image to the host computer 2000 outputting an image read designation is referred to as "pull scan job." Moreover, the processing for generating data by a host computer and FAX-transmitting the data through a public circuit is referred to as "remote FAX transmission job." The present image processor can control the above 11 types of jobs.

<Reservation Setting>

Figure 6:
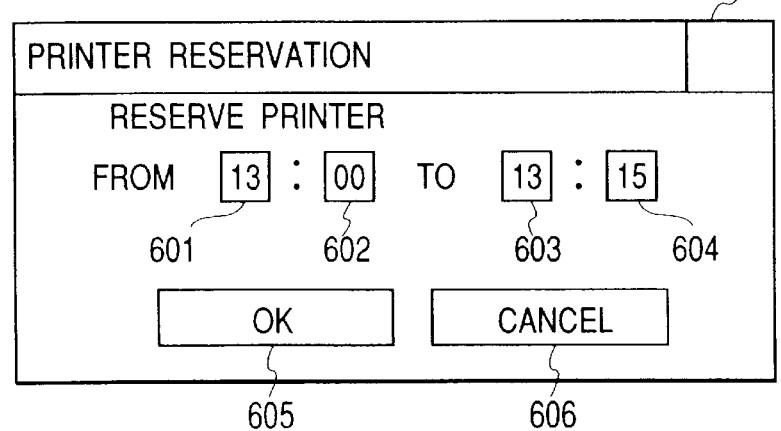
FIG. 6 is an illustration showing a time reservation dialog displayed on a host side when reserving time in the first embodiment of the present invention.

FIG. 6 shows a time reservation dialog displayed on the CRT 10 of the host side when reserving time by this embodiment.

The start time of a reserved time zone is input to 601 and 602. The end time of the reserved time zone is input to 603 and 604. By pressing the "OK" button of 605, the reserved time is transmitted to an image processor. The reserved time is stored in the timetable 501 in FIG. 5. When the reserved time set here is already reserved by other user, it is necessary to reset a reserved time.

Furthermore, not only the above setting can be performed remotely from the host computer 2000 but also the above setting can be directly performed by using the operation panel 1012 of the image processor 1000.

<Processing Block Diagram>

Figure 5:
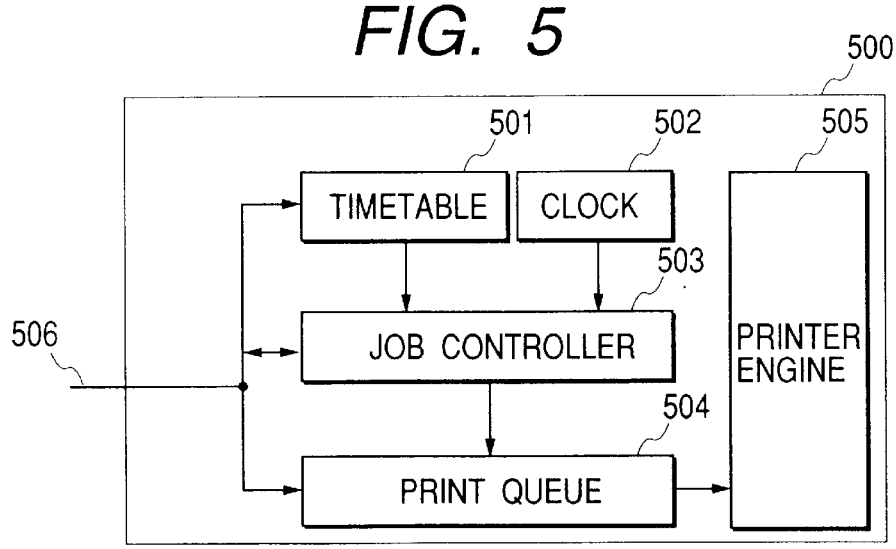
FIG. 5 is a functional block diagram conceptually showing an internal processing of an image processor in the first embodiment of the present invention.

FIG. 5 is a block diagram conceptually showing the internal processing by the image processor of this embodiment. Symbol 501 denotes a timetable for storing a reserved time, which is secured in the RAM 19 in FIG. 2 as an area to store the information for distinguishing between reserved-time information and a reserver. Symbol 503 denotes a job controller which refers to the time table 501 and a clock 502 (corresponding to the clock 21 in FIG. 2) when a new job arrives and determines how to handle the job in accordance with the procedure shown by the flow chart in FIG. 3.

A job to be processed is input to a print queue 504 in accordance with the control by the job controller 503 and printed out by an engine 505 (corresponding to the printer engine 17 in FIG. 2).

Symbol 506 denotes a communication medium (corresponding to the input unit 18 in FIG. 2), which is connected to the host computer 2000 through a network (corresponding to the bidirectional communication medium 22 in FIG. 2) and delivery of job data, setting of a reserved time and a job control method, and notification of a job processed result are performed.

<Reserved Time Shifting>

Figure 7:
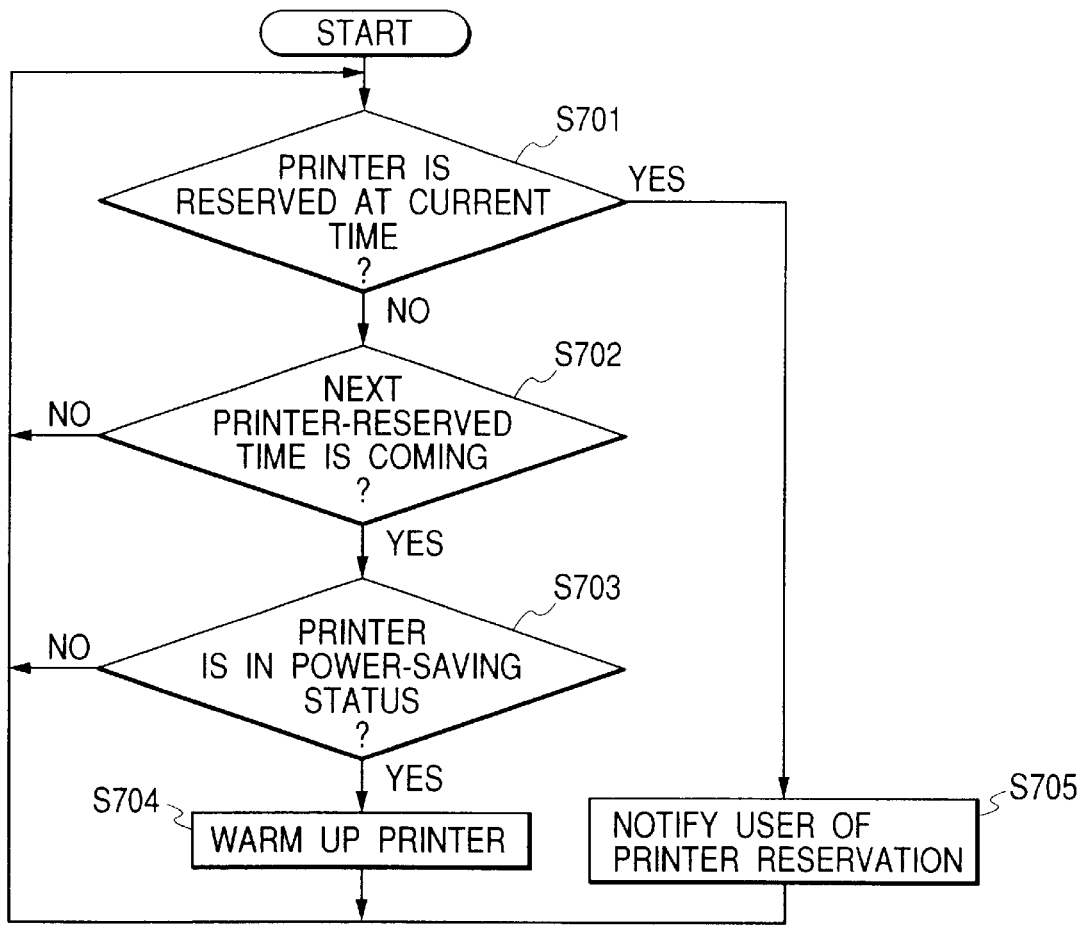
FIG. 7 is a flow chart showing a procedure for communicating the start of reserved time to a reserver and staring warm-up in the first embodiment of the present invention.

FIG. 7 is a flow chart for explaining the shifting to control during a reserved time in this embodiment. FIG. 7 particularly shows the notification of the start of a reserved time from the image processor 1000 to a reserver and the procedure for the start of warm-up. Moreover, S701 to S705 show processing steps.

Figure 8:
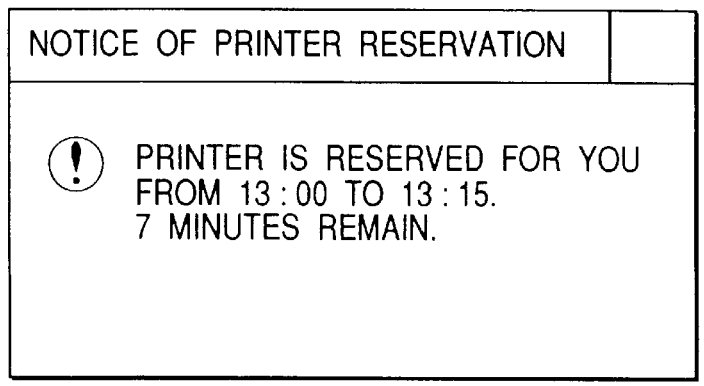
FIG. 8 is an illustration showing a reserved-time communicating dialog displayed on a screen of a host computer of a reserver in a reserved time zone in the first embodiment of the present invention.

First, in S701, the CPU 12 of the image processor 1000 obtains the present time from the clock 21 to judge whether the present time is included in a reserved time zone. When it is judged that the present time is included in the reserved time zone, the CPU 12 identifies a user who sets a reserved time as shown in FIG. 6 and communicates the reserved time to the user. When it is judged that a user performing reservation is a user who remotely sets a reserved time from the host computer 2000, the CPU 12 generates reserved-time communicating information and outputs the information to the host computer 2000 used by the user through a network (bidirectional communication medium 22). When the host computer 2000 receives the reserved-time communicating information through the network (bidirectional communication medium 22), the CPU 1 generates the dialog shown in FIG. 8 in accordance with the reserved-time communicating information, displays the dialog on the screen of the CRT 10, and communicates the reserved-time zone and its remaining time of the reserver. When it is judged that a user performing reservation is a user who sets a reserved time through the operation panel 1012, the CPU 12 generates the dialog shown in FIG. 8 and displays the dialog on the display unit of the operation panel 1012. In this case, a message "reserved time of user name XXX" is displayed on the dialog then displayed.

When it is judged in S701 that the present time is excluded from the reserved time zone, it is judged whether the time up to the next reserved time is smaller than a predetermined time. When it is judged that the next reserved time approaches, the CPU 12 judges in S703 whether the image processor is kept in a power saving state. When it is judged that the image processor 1000 is kept in the power saving state, the CPU 12 performs the warm-up of the image processor 1000 in S704 to prepare for printing-out in the reserved-time zone.

However, when it is judged in S701 and S702 that the present time is excluded from the reserved-time zone or the next reserved time does not approach, or when it is judged in S702 and S703 that the next reserved time approaches but the image processor is not kept in a power saving state, any operation is not performed in S702 or S703 but S701 is restarted.

<Processing During Reserved Time By Image Processor>

Figure 3:
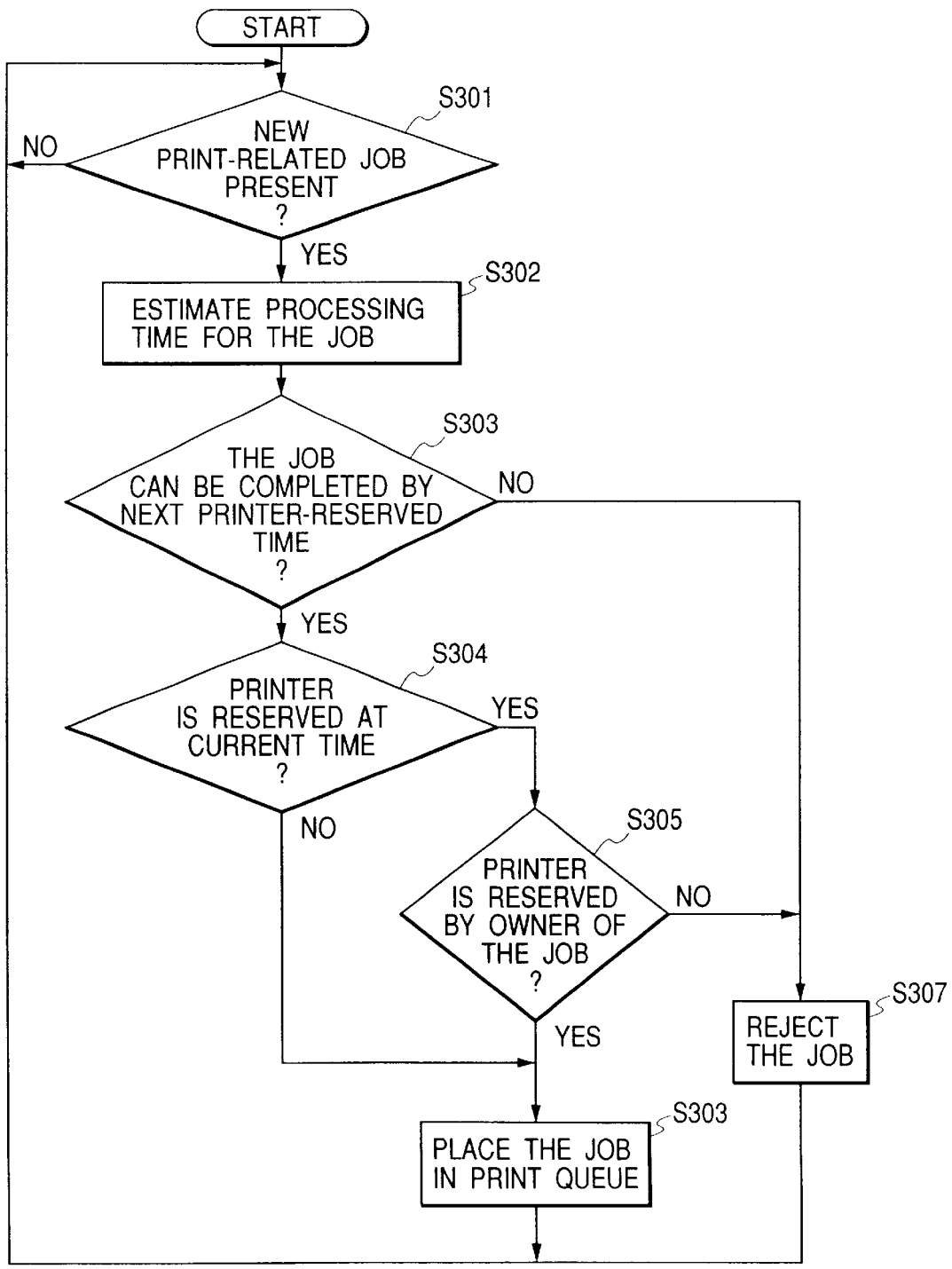
FIG. 3 is a flow chart showing a job control procedure of an image processor in a first embodiment of the present invention.

FIG. 3 shows the procedure of job control in this embodiment executed by the CPU 12 of the above image processor 1000. S301 to S307 show processing steps. These steps S301 to S307 are executed when printing control program stored in the external memory in the host computer 2000 generates printer data and transmits it to the image processor 1000 (print job), control data such as an image read designation is transmitted from the host computer 2000 (remote copy job, remote scan job, or pull scan job), a designation is output from the operation panel serving as the input unit 18 (copy job, scan job, or push scan job), or FAX data is transmitted through a public circuit (FAX reception job or FAX up job).

First, in S301, the CPU 12 judges whether there is a new job relating to printing. That is, the CPU 12 judges whether there is a "print job," "copy job," "remote copy job," or "FAX reception job." Because any one of "remote scan job," "pull scan job," "scan job," "push scan job," and "FAX up job" does not relate to printing, the CPU 12 judges that these jobs are not new jobs relating to printing, controls these jobs, and returns the processing to step S301. When a new job relating to printing is confirmed, the CPU 12 estimates the time required for the new job in S302. When the new job is "print job," the CPU 12 estimates a processing time in accordance with a sheet size, the number of sheets to be printed, and the amount of print data. When the new job is "copy job" or "remote copy job," the CPU 12 detects the size of a manuscript image, counts the number of manuscript images, and estimates a processing time in accordance with the image read rate and printing rate (ppm) of the image processor 1000. When the new job is "FAX reception job," the CPU 12 receives the information for a manuscript-image size and the number of manuscript images by communicating with a public circuit and estimates a processing time in accordance with the information and the image read rate.

Then, in S303, the CPU 12 judges whether the job can be completed before the next reserved time in accordance with the estimated required time. When the CPU 12 judges that the job is completed before the next reserved time, it judges in S304 whether the present time is included in a reserved time zone.

When the present time is excluded from the reserved time zone, the CPU 12 inputs the job into a print queue in S306 in order to process the job.

When the present time is included in the reserved time zone, the CPU 12 judges in S305 whether the job belongs to a reserver reserving the time zone. When the job is "copy job," the CPU 12 judges whether the job is designated by the reserver in accordance with "user name" and "password" input when using the image processor 1000. When the job is "print job," the CPU 12 analyzes the data for the print job and obtains the "user name" and "log-in name" of a host computer transmitting the job to judge them. When the job is "FAX reception job," the CPU 12 obtains the telephone number of the other party to judge whether the telephone number is that of a reserver.

When the job is a job of the reserver, the CPU 12 inputs the job into a print queue in S306 to successively print the job.

When it is judged that the job is a job of a party other than the reserver, the CPU 12 rejects the acceptance of the job in S307. Moreover, in S303, it is judged that the job is not completed before a reserved time, the CPU 12 also rejects the acceptance of the job in S307.

Figure 4:
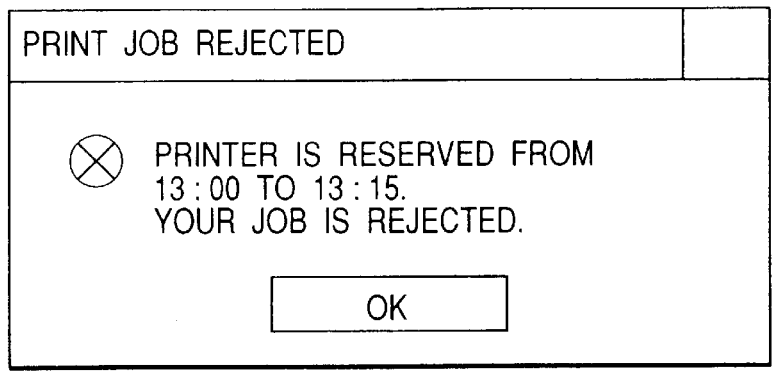
FIG. 4 is an illustration showing a dialog for communicating the rejection of a job, displayed on a screen of a host computer generating a rejected job of a party other than a reserver in a reserved time zone in the first embodiment of the present invention.

In S307, the CPU 12 further cancels the rejected job and communicates the rejection of the job to a job-designating source. When the job is "print job," the CPU 12 rejects the job to the host computer 2000 serving as a job generating source. When the rejection of the job is communicated from the image processor 1000, the job-generating-source host computer generates the dialog shown in FIG. 4 indicating that a printing control program in the external memory 11 is rejected because the job is included in a reserved time zone of other job and performs control so as to display the dialog on the screen of the CRT 10. When the job is "copy job," the CPU 12 displays the content shown in FIG. 4 on the display unit of the operation panel 1012. When the job is "FAX reception job," the CPU 12 generates the FAX data having the content shown in FIG. 4 and FAX-transmits the data to the FAX having the telephone number of a transmitting source through a public circuit.

<Detailed Reservation Setting>

FIG. 19 shows a time reservation dialog displayed on the CRT 10 of a host side by a reservation setting utility. Differences from FIG. 6 describing simple reservation setting will be described below. Moreover, it is possible to display a user interface provided by the reservation-time setting utility on the operation panel 1012 of the image processor 1000 and make a user set the interface through the operation panel 1012.

Symbols 1901 to 1904 are the same as symbols 601 to 604 in FIG. 6, to which the start time and end time of a reserved time zone are input.

Symbols 1905 and 1906 denote alternative radio buttons. When selecting the button 1905, the image processor 1000 performs the job control same as the case of selecting the "OK" button 605 in FIG. 6. That is, the button 1905 is specifying means for canceling all jobs from other users, communicating that all jobs are canceled, and performing control so as to print only jobs from a specified user. When selecting the button 1906, a job of a party other than a reserver can be processed even in a reserved time zone unless a job of the reserver is processed. That is, the button 1906 is means for preferentially processing a reserved user's job.

Exception setting when processing a job of a party other than a reserver will be described below.

Symbol 1907 denotes specifying means for setting a maximum time required for a job that can be processed. A job not exceeding a necessary time set here is immediately input into the print queue 504 in FIG. 5. Processing of a job exceeding the necessary time set by the button 1907 follows the setting of alternative buttons 1908 and 1909.

The button 1908 is means for specifying that jobs are accepted but they are not printed in the reserved times specified by the buttons 1901 to 1904. When the button 1908 is selected, a job (job of a party other than a reserver) is not printed before a reserved time expires but a standby state is kept. However, when the image processor 1000 has a large-capacity memory such as a HD (hard disk or the like), it is possible to analyze an accepted print job, develops the job into a bit map, and store it in the HD. Thus, an advantage is obtained that printing can be executed immediately after a reserved time expires. Therefore, when the button 1908 is selected, the image processor 1000 judges whether a large-capacity memory is set to the image processor 1000. When it is judged that the large-capacity memory is set, the image processor 1000 analyzes and develops a print job received from a host computer and stores an image in the large-capacity memory. When it is judged that a large-capacity memory is not set, the image processor 1000 stores the print job received from the host computer in the RAM 19 while keeping a printer language.

Symbol 1909 denotes a button for specifying that a job of a party other than a reserver is divided and processed in a reserved time. Moreover, symbol 1910 denotes means for specifying how to divide a job when diving and processing the job. When the button 1909 is selected, the job is divided into jobs respectively having a size within a time required for processing set by the button 1910 and each divided job is input to the print queue 504 in FIG. 5. Thereby, even when a job of a reserver is input, it is possible to prevent the processing of the job of the reserver from uselessly delaying due to the processing of a job of a party other than the reserver.

To process a job of a party other than a reserver in a reserved time zone, the image processor 1000 generates reserved-time processing information and outputs the information to the host computer 2000 corresponding to the user who is the reserver. Moreover, to execute a job of a party other than a reserver, the image processor 1000 generates job acceptance information and outputs the information to the host computer 2000 corresponding to a user designating the job. The host computer 2000 of a reserver receives reserved-time processing information from the image processor 1000, generates the dialog shown in FIG. 20 in accordance with the reserved-time processing information, displays the dialog on the display unit of the screen of the CRT 10 of a reserver's host computer (at the time of remote setting), and communicates that a job of other user is processed.

Moreover, when reservation setting is executed on the operation panel 1012 of the image processor 1000, the same message is displayed on the operation panel 1012 of the image processor 1000 (at the time of local setting from the operation panel).

In this case, a host computer of a job generating party who is a non-reserver receives job acceptance information from the image processor 1000, generates the dialog shown in FIG. 21, displays the dialog on the CRT 10 of the job generating party who is a non-reserver, and notifies the user that a job is accepted and how the job is divided in detail.

Figure 9:
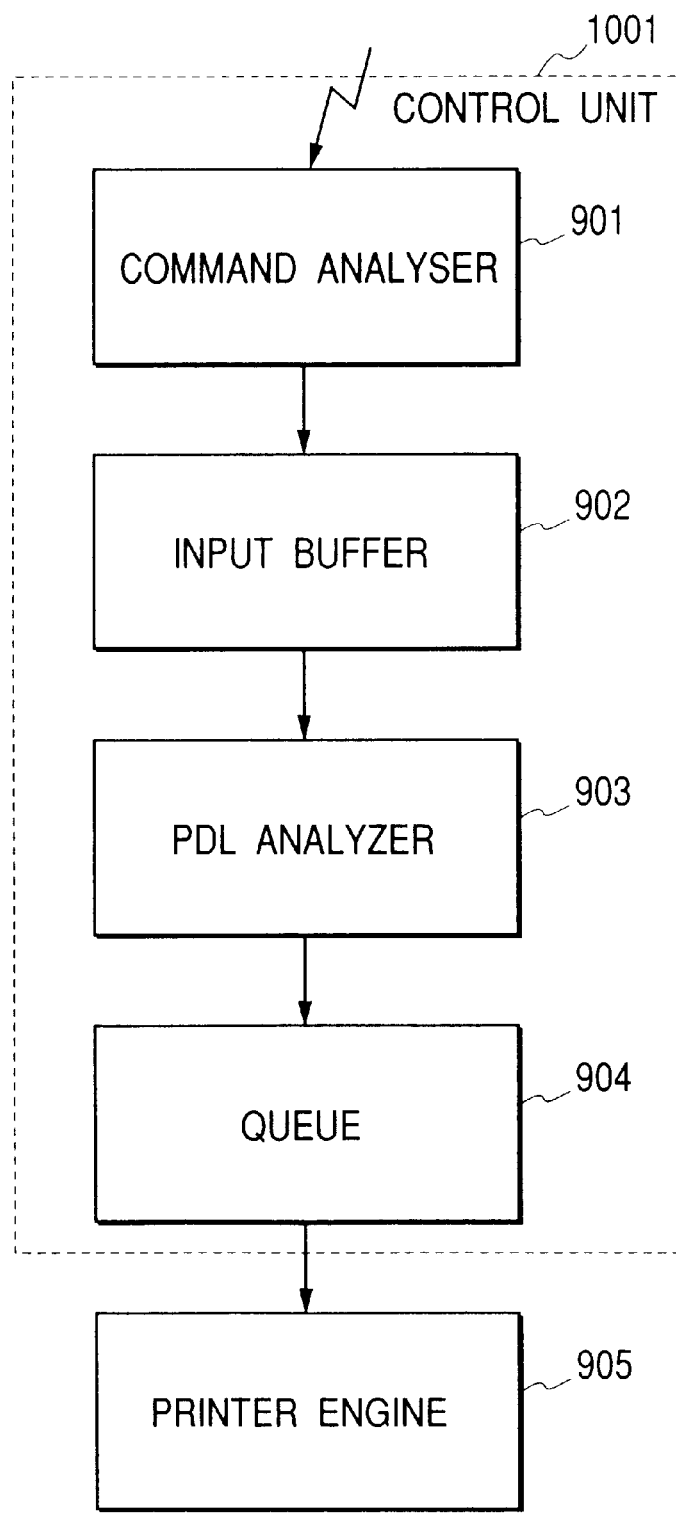
FIG. 9 is a block diagram of a processing of a print job for a second embodiment of the present invention.

Symbols 1911, 1912, and 1913 respectively denote means for setting a resource to be previously secured by a reserver in order to securely process a job of the reserver. That is, symbol 1911 denotes the type of a sheet used for printing a job of a reserver (FIG. 9 shows a case of setting a size A4 as an example) and 1912 denotes the number of sheets to be printed.

A sheet set here is stored in a sheet-securing unit in an image processor not illustrated in FIG. 1. The sheet-securing unit can be also realized by temporarily using the both-side printer of the image processor 1000 (intermediate tray 2320). A sheet secured here is used only for a print job to be performed by a reserver in a reserved time zone. The resource is after the reserved time expires, handled similarly to sheets in a sheet feeder, and used from other job. Moreover, after the reserved time expires, a secured memory capacity is released and used for other job.

Symbol 1913 specifies the total capacity of a memory in the print queue 504 in FIG. 5 to be previously secured by a reserver. A memory specified here is used only for a print job to be performed by a reserver in a reserved time zone but it is released after a reserved time expires.

Symbol 1914 denotes an "OK" button and 1915 denotes a cancel button. When a user presses the OK button 1914, the host computer 2000 generates reservation setting information in accordance with the information set by a user interface 1900 of a reservation setting utility and transmits the reservation setting information to the image processor 1000 through the bidirectional communication medium 22 (network). When the image processor 1000 receives the reservation setting information from the host computer 2000, the CPU 12 analyzes the information to judge whether a specified time zone is a reserved time zone from other user. When it is judged that a reservation is not requested from other user, the CPU 12 sets the reservation and stores the information in the external memory 14. When a reservation is requested from other user, the CPU 12 does not accept the reservation and communicates the result to the host computer 2000 transmitted the reservation setting information. After the image processor 1000 sets a reservation in accordance with the reservation setting information, it analyzes resource-reserving information included in the reservation setting information to secure a resource. Specifically, the processor 1000 feeds recording sheets having a proper size from sheet feeders (sheet cassettes 2314 and 2315) in accordance with pieces of information for a sheet size and the number of sheets to be secured, carries the recording sheets up to the front of the ejection rollers 2318 without performing any transferring, thereafter leads the recording sheets to a sheet refeed path by the flapper 2319, secures the specified number of recording sheets in the intermediate tray 2320, and wait. When a job is input from a reserver user in a reserved time, recording sheets are fed to the transfer unit 2316 from the intermediate tray 2320, then transfer is started and printing is performed. Moreover, a work memory of the RAM 19 is secured in accordance with secured specified memory capacity information so that the work memory is not used by other job in a reserved time. That is, when processing a job of a non-reserver user in the reserved time, the processing rate may be slightly lowered because the work memory for a secured memory cannot be used.

Moreover, in case of the first embodiment, the reservation setting information generated by the host computer 2000 is sent to an image processor independently of a print job and an object for reservation is a user.

Thus, in case of this embodiment, it is possible to set a reservation remotely from the host computer 2000 or locally from the operation panel of the image processor 1000. Therefore, the operability is improved.

Moreover, because not only a time but also a resource can be reserved, it is possible to securely process a reserved user's job.

Furthermore, because an image processor can be used by only a specified user in a reserved and specified time zone, it is possible use the image processor as an exclusive image processor excluding jobs of other users.

Furthermore, because jobs of non-reserver users can be limited in a reserved and specified time zone, it is possible to preferentially process a job of a specified user.

Second Embodiment

The first embodiment of the present invention makes it possible to reserve a resource in order to preferentially and securely process a job of a reserver in a reserved time zone. Therefore, in case of a second embodiment of the present invention, a case of setting a reserved time zone to a job or changing reserved time zones and moreover, a case of setting a reserved time zone to a file to be printed will be described.

FIG. 9 is a block diagram of print job processing in the present invention.

A command analyzer 901 successively analyzes the data received by an input unit 18, that is, commands for print jobs shown in FIG. 12 to be described later. Among analyzed pieces of information, pieces of information to be controlled as jobs are stored in the job table in FIG. 17 to be described later generated in a RAM 19.

The pieces of information to be controlled include a received sequence (such as job numbers), user name, file name, processing state, reserved time, and reserved resource information.

An input buffer 902 temporarily stores actual output data among pieces of information analyzed by the command analyzer 901 in the RAM 19.

A PDL analyzer 903 develops the printing information (PDL) to be actually output stored in the receiving buffer 902 into image data that can be printed.

A queue 904 successively stores pieces of information to be supplied to a printer engine 905 to be described later in the RAM 19. The printer engine 905 actually prints, that is, transfers the jobs successively stored in the RAM 19 to printing sheets.

<Print Data Generation>

Print job data is generated by the host computer 2000. The host computer 2000 functions as data generation means in this embodiment.

The print job data can be mainly classified into three attributes such as (1) data for managing print jobs, (2) document data to be printed, and (3) data for printing control and each attribute is described in accordance with command information. Each piece of command information is provided with a piece of header information corresponding to each piece of command information and each piece of head information and each piece of command information are paired. The print job data is data described by a pair of a piece of header information and a piece of command information or a combination of pluralities of pieces of header information and command information.

Figure 12:
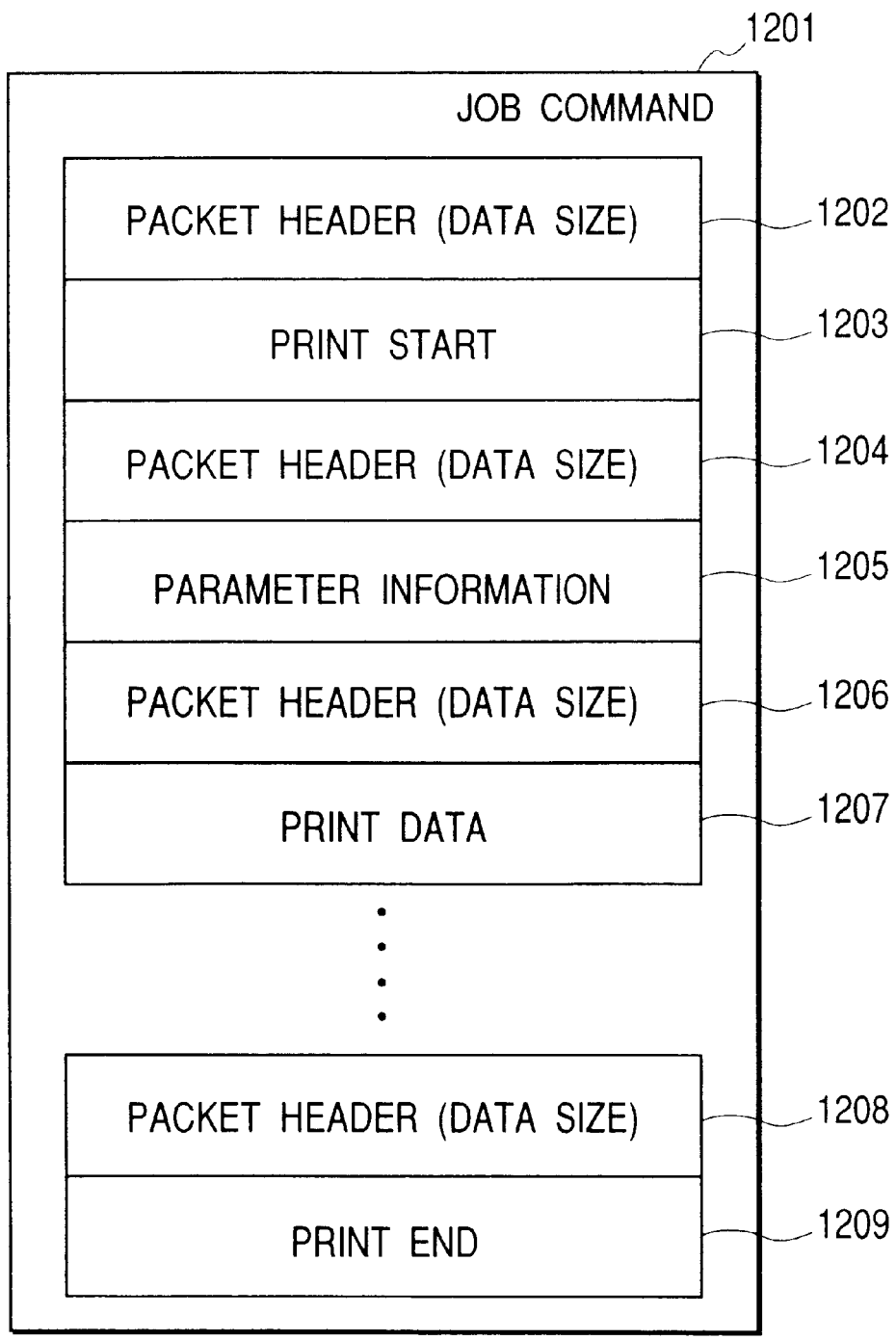
FIG. 12 is a block diagram of print data received from a host computer in the second embodiment of the present invention.

FIG. 12 is a block diagram of the print data received from the host computer 2000.

Symbol 1201 denotes a series of commands used for one type of printing, that is, job commands.

Symbol 1202 denotes a packet header of a command 1203 to be described later. The data size of a command 1203 is stored in the packet header.

The command 1203 is a command showing the start of a job. This command to an end command 1209 to be described later are the data to be controlled as one job.

Symbol 1204 denotes a packet header of a command 1205 to be described later. The data size of the command 1205 is stored in the packet header.

The command 1205 is a parameter setting command and setting data. The setting data includes sheet size information and information for the number of sheets to be printed. An image processor 1000 is able to calculate a necessary time in accordance with the setting data.

Symbol 1206 denotes a packet header of a command 1207 to be described later. The data size of the print data 1207 is stored in the packet header.

The print data 1207 is print data (PDL data) to be actually printed.

Symbol 1208 denotes a packet header of a command 1209 to be described later. The data size of the command 1209 is stored in the packet header.

The command 1209 is a job end command that is paired with the job start command 1203 to identify job information.

It is permitted that information other than sizes of following commands, that is, packet identifying data is stored in the packet headers 1202, 1204, 1206, and 1208 and the information other than data sizes of following commands is not restricted.

Packet header information is not restricted to single piece of information. It is possible to describe a plurality of pieces of information together. For example, the capacity of data and identifying data for identifying that the data is control data or document data to be printed are described together.

The print job 1201 is transceived in packets by forming a packet header and a parameter as a collection of data. In this case, a packet is not a low-order packet referred to as a packet for data communication through a network but a high-order concept referred to as a collection of data.

The information enclosed by the print start command 1203 and the print end command 1209 is handled as a print job unit.

Moreover, not only a print job but also a remote copy job and a pull scan job are respectively transmitted as the above packet-type command. In this case, the packet of print data corresponding to 1207 is omitted, and a read start command (or copy start command) is sent to a part corresponding to 1203 and a read end command (or copy end command) is sent to a part corresponding to 1209 instead.

Figure 11:
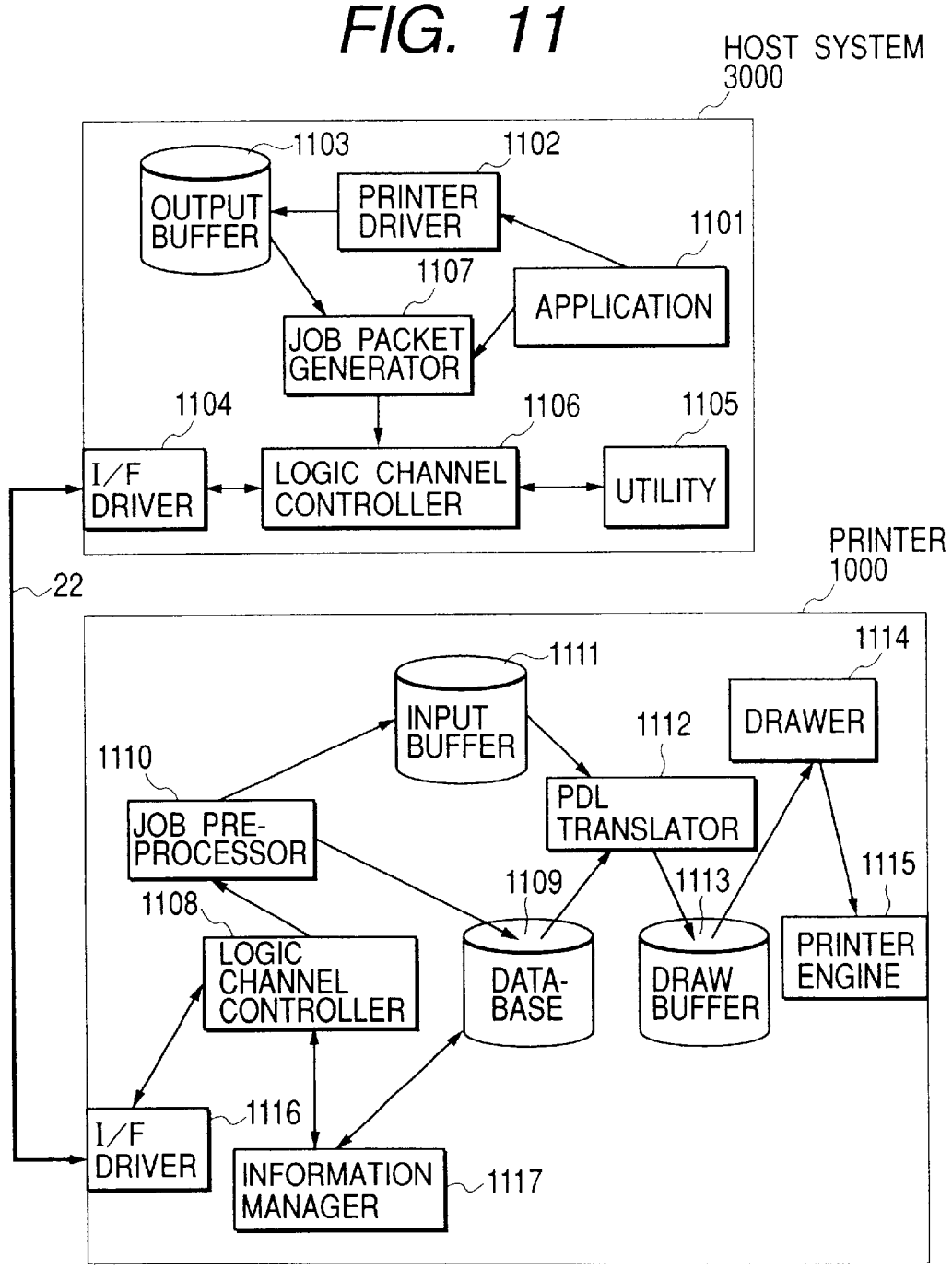
FIG. 11 is a block diagram showing a schematic configuration of a printing system of the second embodiment of the present invention.

FIG. 11 is a block diagram showing a schematic configuration of a printing system of the second embodiment of the present invention. The printing system of the second embodiment of the present invention is constituted by connecting the host computer 2000 with the image processor 1000 through a local area network (bidirectional communication medium) 22. For the second embodiment of the present invention, a case is described as an example, in which a local interface specified in IEEE (Institute of Electrical and Electronics Engineers) 1284 is used as the bidirectional communication medium 22. However, it is permitted to use a network like the case of the first embodiment.

The host computer 2000 constituting the printing system of the second embodiment of the present invention is provided with an application 1101, a printer driver 1102, an output buffer 1103, an I/F driver 1104, a utility 1105, a logic channel controller 1106, and a job packet generator 1107.

Functions of the above units are described below in detail. The application 1101 provides a graphic user interface for a user to generate video data meeting a purpose of the user. The printer driver 1102 converts the video data generated by the application 1101 into page description language (PDL) data which can be printed by the image processor 1000. The output buffer 1103 temporarily stores the PDL data generated by the printer driver 1102. The job packet generator 1107 generates job packet data in accordance with the PDL data stored in the output buffer 1103.

The utility 1105 obtains information from the image processor 1000 and supplied the information to a graphic user interface or changes environmental settings of an image processor 1000 in accordance with a request from a user. The logic channel controller 1106 uses job packet data sent from the job packet generator 1107 as a data channel and state obtaining and environment setting transferred to and from the utility 1105 as a management channel and thereby, packets data values sent from two logic channels and converts the data into one physical channel. That is, because the bidirectional interface 22 physically serves as one bidirectional interface (IEEE-1284 interface in the case of this embodiment), two different types of data values are transceived through one interface and therefore, the logic channel controller 1106 is used.

In this case, the logic channel controller 1106 of this embodiment is controlled so as to perform multichannel communication by using the communication system of IEEE 1284.4. The IEEE 1284.4 transceives data in accordance with the unit referred to as credit. To transceive data, the IEEE 1284.4 first outputs a credit request and receives a credit corresponding to the request and thereby, performs communication. In this case, two credits for management are always prepared separately from the data transceiving credit. Therefore, even while an image processor receives print data, it is possible to receive a control command from a management channel (management credit).

The I/F driver 1104 transmits the PDL data stored in the output buffer 1103 to the image processor 1000 and transceives the information in the image processor 1000.

In this case, though a print job is generated as described above, it is possible to generate a remote copy job and a remote scan job by using a device driver capable of controlling the whole of the image processor 1000 instead of the printer driver 1102.

Moreover, the image processor 1000 constituting the printing system of the second embodiment of the present invention is provided with a logic channel controller 1108, a database 1109, a job preprocessor 1110, an input buffer 1111, a PDL translator 1112, a draw buffer 1113, a drawer 1114, a printer engine 1115, an I/F driver 1116, and an information manager 1117.

Functions of the above units will be described below in detail. The I/F driver 1116 receives the PDL data transmitted from the host computer 2000, transmits the information in the image processor 1000, and receives environmental setting.

The logic channel controller 1108 converts the packet data received by the I/F driver 1116 into two logic channels such as a data channel and a management channel and supplies the channels to a subsequent stage. In this case, when the packet data received from the host computer 2000 is a print job, it is supplied to the job preprocessor 1110 and when the packet data is the packet data for a job management command used to control jobs, it is supplied to the information manager 1117.

The job preprocessor 1110 corresponding to added-information analyzing means of the present invention receives the data for a data channel from the logic channel controller 1108, transfers PDL data to the input buffer 1111, or sets information to the database 1109. Though described later for FIG. 13, when a job packet is a job start command, the job preprocessor 1110 assigns a job number to the command and sets a job number to a job table in the database 1109, and sets job status information 1707 corresponding to the job number "currently received." Moreover, when a job packet is a PDL data command, the job preprocessor 1110 transfers PDL data and a job number to the input buffer 1111. Furthermore, when a job packet is a job attribute packet, the job preprocessor 1110 sets the content of a parameter to a job table in the database 1109. The job preprocessor 1110 stores all the PDL data of a certain job number in the input buffer 1111 and then, updates the job status information 1707 in a job table in the database 1109 to "standby for printing."

The input buffer 1111 temporarily holds the PDL data to which a job number is assigned to serve as a cushioning material for a delay of subsequent processing. The database 1109 stores the data base for units of the image processor 1000 and the job information for drawing print jobs. A job table in the database 1109 is described later for FIG. 17.

The information manager 1117 receives a management packet sent to a management channel to rewrite the information in the database 1109 in accordance with the operation code and data written in a management packet or control jobs in accordance with the data in the management packet. Job control is described later for FIG. 15.

The PDL translator 1112 translates PDL data, converts the PDL data into intermediate data for a drawing object suitable for drawing, and stores the intermediate data in the draw buffer 1113. Moreover, when the PDL translator 1112 recognizes that analysis of a job to which a new job number is assigned from the input buffer 1111 is started, it updates the job status information 1707 in a job table in the database 1109 to "under analysis."

The draw buffer 1113 temporarily stores a drawing object until it is actually printed. When intermediate data for one page is stored, printing is started by the drawer 1114.

The drawer 1114 generates a bit map image by actually drawing the drawing object stored in the draw buffer 1113 and transmits the bit map image to the printer engine 1115. When generation of a bit map image having a new job number is started, the drawer 1114 updates the job status information 1707 in a job table in the database 1109 to "under printing."

The printer engine 1115 receives a bit map image from the drawer 1114 to print the image on a medium such as a sheet through a known printing art.

Figure 10:
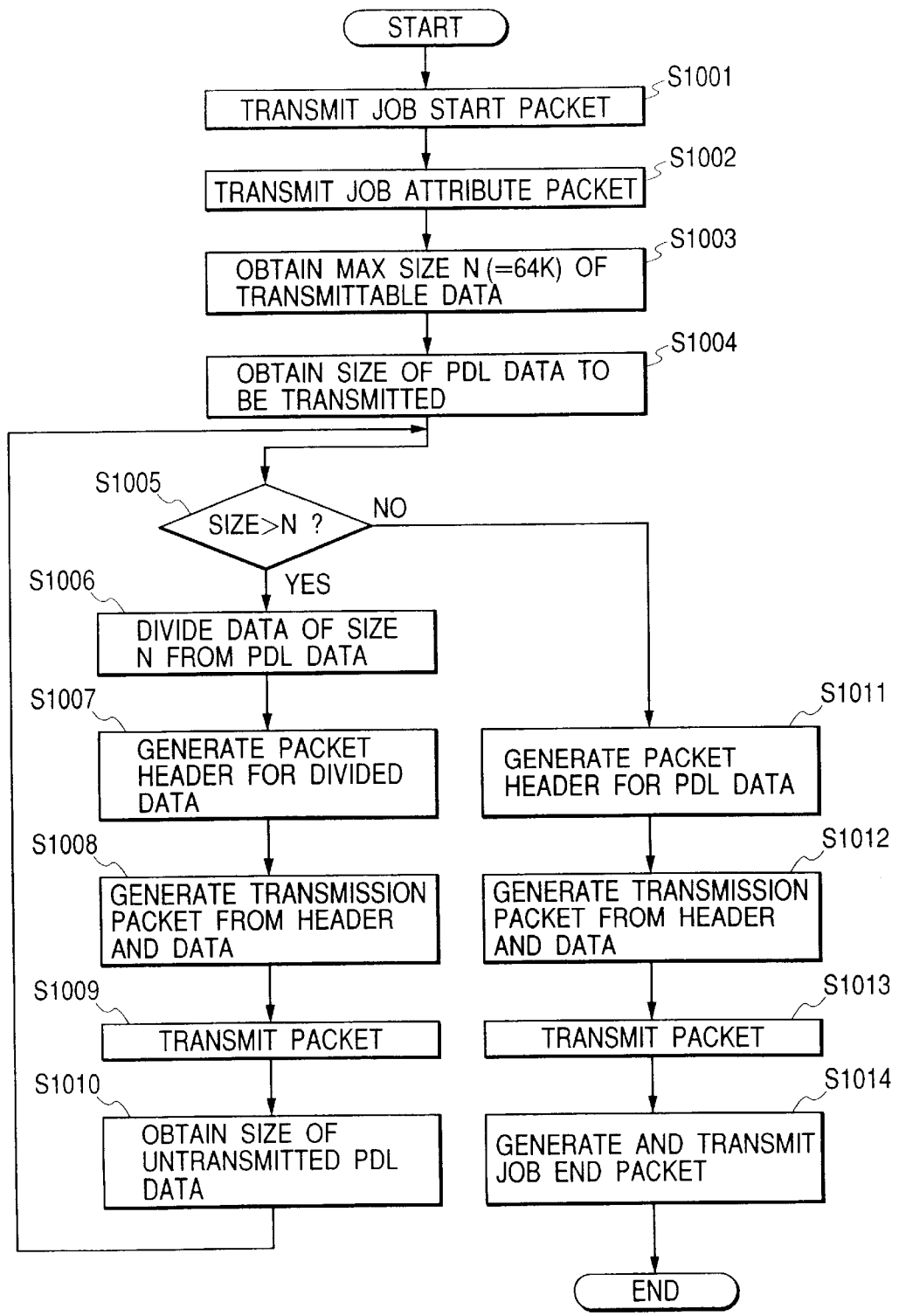
FIG. 10 is an illustration showing an example of job-packet generation of a host computer in the second embodiment of the present invention.

A control of job packet generation in the job packet generator 1107 of the host computer 2000 is described below by referring to FIG. 10.

The processing for a user to generate the data serving as the base of the print data comprising a job packet to be transmitted by the host computer 2000 by using the application 1101 on the host computer 2000 is omitted.

When the data generated by the application is transmitted to the printer driver 1102 through a GDI (Graphic Device Interface) or the like, the printer driver 1102 generates PDL data in accordance with the data input from the GDI and stores the data in the output buffer 1103. When the PDL data is successively stored in the output buffer 1103, the job packet generator 1107 starts generation of a job packet. In this case, the printer driver displays the time reservation dialogs (FIGS. 6, 19, and 22) on the CRT 10 connected to the host computer 2000 to prompt a user to specify a reserved time. In this case, when no data is input, it is regarded that there is no reserved job.

In step S1001, the job packet generator 1107 generates a job start packet and transmits it to the logic channel controller 1106. The job start packet comprises the packet header 1202 and print start command 1203 in FIG. 12.

In step S1002, the job packet generator 1107 generates a job attribute packet and transmits it to the logic channel controller 1107. The job attribute packet comprises the packet header 1204 and parameter information 1205 in FIG. 12. As described above, a job attribute includes attributes such as a job name, a job owner name, and device names scheduled to occupy a job size, a job-processing reserved time, the number of job pages, a page size, a sheet feed stage, and a sheet ejection bottle. The printer driver 1102 can obtain the device names scheduled to occupy a job name, a job size, the number of job pages, a page size, a sheet feed stage, and a sheet ejection bottle from a GDI. Moreover, for a job owner name, a user name at the time of log-on of a user can be obtained from a function attached to an OS. For a job size, a PDL generated by the printer driver 1102 can be obtained through internal calculation.

A job-processing scheduled time uses a date input from text boxes 1901 to 1904 of a reservation setting dialog 1900 previously described for the first embodiment. Thereby, a user can reserve the printing of the job at any time. Moreover, the user can manually reserve a resource to be reserved from option menus 1906 to 1909 on the reservation setting dialog 1900.

In step S1003, the job packet generator 1107 obtains the maximum size N of transmissible data. As described above, the maximum size of job packets of this system is 64 Kbyte.

Then, in step S1004, the job packet generator 1107 obtains the size of data to be transmitted. That is, the size of the PDL data stored in the output buffer 1103 is obtained. In step S1005, the job packet generator 1107 judges whether the size of the output data (PDL data) obtained in step S1004 is larger than the maximum size N. If it is judged that the size of the output data is larger than the maximum size N, the processing in step 1006 is started and the job packet generator 1107 divides the PDL serving as output data into a part having the size N (in this case, 64 Kbyte) and a part other than the former part.

In step S1007, the job packet generator 1107 generates packet header information for the part having the size N among divided data values. Moreover, in this case, the generator 1107 sets a packet-header continuous flag to "1."

Then, in step S1008, the job packet generator 1107 connects packet head information with output data (PDL) and generates a job packet serving as an output data packet. PDL data is directly set to the data part of the job packet.

In step S1009, the job packet generator 1107 transmits the generated job packet to the logic channel controller 1106.

Then, in step S1010, the job packet generator 1107 obtains the size of the PDL data of a part not transmitted (divided remaining part) and the processing in step S1005 is restarted.

Moreover, in step s1005, it is judged that the size of the output data is less than the maximum size N, step S1011 is started and the job packet generator 1107 generates the packet head information to the output data. Moreover, in this case, the packet-header continuous flag is set to "0."

Then, in step S1012, the job packet generator 1107 connects the packet head information with the output data (PDL) to generate a job packet serving as an output packet.

In step 1013, the job packet generator 1107 transmits the generated packet to the logic channel controller 1106 to complete the processing.

In step S1014, the job packet generator 1107 generates a job end packet and transmits it to the logic channel controller 1106. The job end packet comprises the packet header 1208 and print end command 1209 in FIG. 12.

Thus, a reserved print job is generated in the form of a packet and transmitted from the host computer 2000 to the image processor 1000 through the logic channel controller 1106.

<Processing and Execution of Print Job Data>

Figure 13:
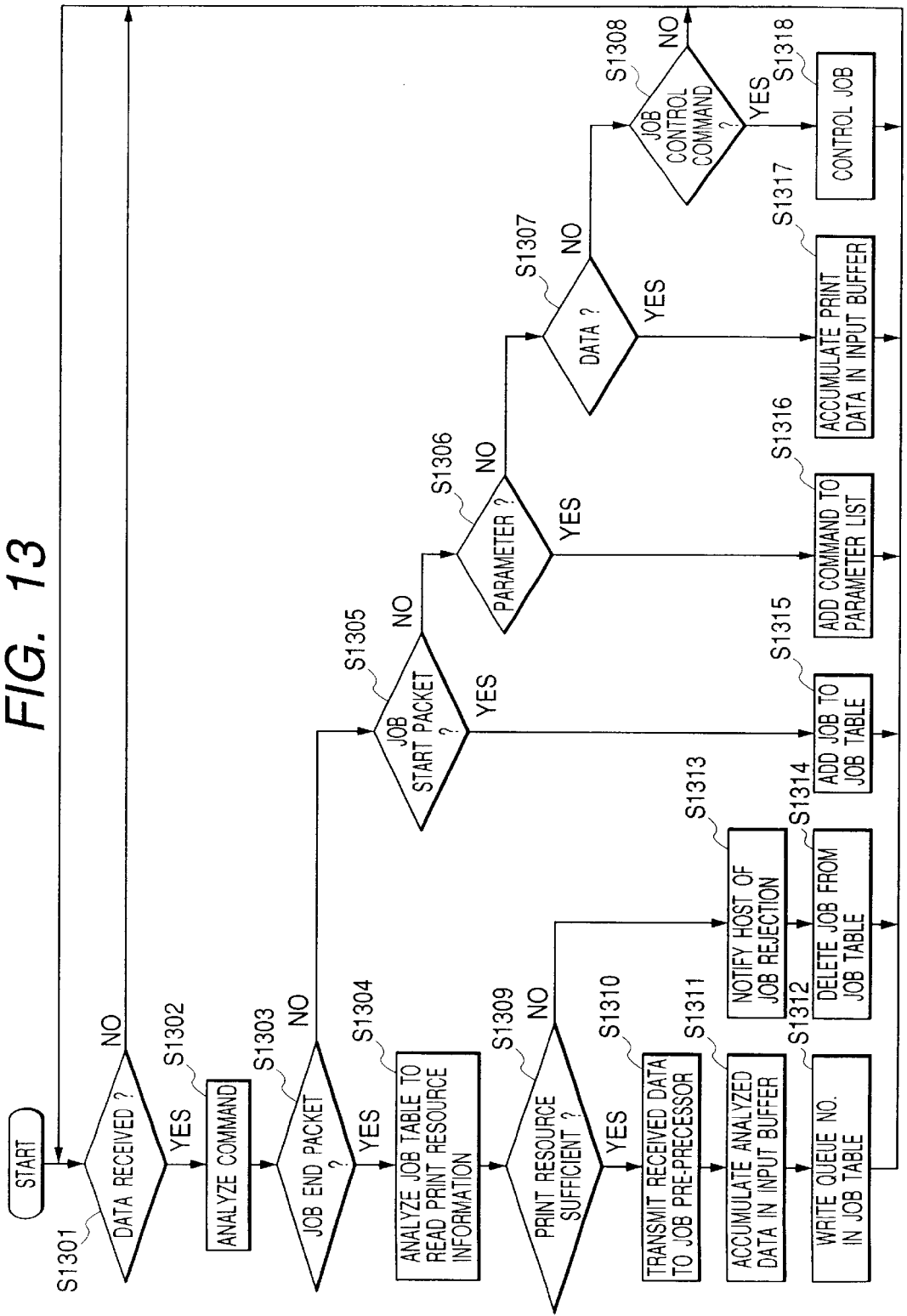
FIG. 13 is a flow chart showing the processing of input data of an image processor in the second embodiment of the present invention.

The flow chart in FIG. 13 shows the processing of input data in the image processor 1000. Input data can be mainly divided into three types of attributes such as (1) data for managing a print job, (2) document data to be printed, and (3) data for print control. The command analyzer 901 analyzes input data from this viewpoint.

When the I/F driver 1116 serving as an input unit 18 receives any data from the host computer 2000 (S1301), the logical channel controller 1108 and job preprocessor 1110 successively analyze the commands received by the I/F driver 1116 in step S1302.

In step S1303, the logic channel controller 1108 checks whether an analyzed command is a job end packet. When the analyzed command is a job end packet, step S1304 is started.

When the analyzed command is not a job end packet, the logic channel controller 1108 checks in step S1305 whether the analyzed command is a job start packet. When the analyzed command is a job start command, step S1315 is started to add the job to a job table.

When the analyzed command is not a job start packet, the logic channel controller 1108 checks in step 1306 whether the analyzed command is a job attribute packet serving as a parameter setting command. When the analyzed command is a job attribute packet, step S1316 is started to add a parameter list to a job table.

When the analyzed command is not a job attribute packet, the logic channel controller 1108 checks in step S1307 whether the analyzed command is an output data packet serving as a data command. When the analyzed command is an output data packet, step S1317 is started to store print data in the input buffer.

When the analyzed command is not an output data packet, the logic channel controller 1108 checks in step S1308 whether the analyzed command is a job control command. When the analyzed command is a job control command, step S1318 is started to control jobs. The job control will be described later for FIG. 15. When the analyzed command is not a job control command, step S1301 is started because it is judged that unexpected data is input.

In step S1304, the logic channel controller 1108 analyzes a job table in the database 1109 added in step S1316 to be mentioned later and reads the printing resource information from the parameter list. The printing resource information includes the device names scheduled to occupy the number of job pages, a page size, a sheet feed stage, and a sheet ejection bottle set in step S1002. In this case, when a job is time-reserved, a necessary resource is reserved to the database 1109. A printing resource reserved here cannot be used by other jobs hereafter.

Moreover, when a time-reserved job is present and moreover, jobs having the same file name are present in file names 1704 in a job table, it is regarded that a reserved job is overwritten and job tables having the same name are updated. FIG. 18 is a job table showing resource names and job numbers reserving the resource names. As shown by the job table, for example, a sheet feed tray (sheet cassette) having a resource name of "A4 sheet feed tray" is reserved in the job having a job number 5.

In step S1309, the logic channel controller 1108 receives a job end command to check whether the number of printing resources enough to execute received jobs is left. When the number of printing resources is insufficient, the controller 1108 communicates the rejection of acceptance of a job to the host computer 2000 and thereafter, deletes a job number 1701 from the job table of FIG. 17 in the database 1109.

In step S1310, the logic channel controller 1108 transfers a series of print job data values already received to the job preprocessor 1110. It is unnecessary to transfer data from the logic channel controller 1108 to the job preprocessor 1110 after all data values are prepared like the case of this embodiment. It is permitted to successively transfer data values every specified size. The data transfer timing is not restricted. For example, the processing following step S1315 to be described later is permitted.

Then, in step S1311, the data analyzed by the job preprocessor 1110 is stored in the input buffer 1111. The timing for transferring data from the job preprocessor 1110 to the input buffer 1111 is not restricted.

In step S1312, the job preprocessor 1110 stores data in the input buffer 1111 and then, writes a proper number in the queue number 1702 in a job table of FIG. 17 in the database 1109.

In step S1311, the job preprocessor 1110 receives a job start packet from the logic channel controller 1108 writes the job number 1701 in the job table of FIG. 17 in the database 1109 and prepares the reception of a series of following commands.

In step S1312, the job preprocessor 1110 receives a job attribute packet from the logic channel controller 1108 and adds desired data to 1704 to 1706 in the job table of FIG. 17 in the database 1109.

In step S1313, because it is judged that the number of resources for processing the job is insufficient, the logic channel controller 1108 communicates the rejection of acceptance of a job to the job preprocessor 1110, generates a control packet showing that the acceptance of the job is rejected for the host computer 2000 serving a source for transmitting the job, and outputs the control packet from the I/F driver 1116 through the IEEE 1282 (bidirectional communication medium 22).

Then, in step S1314, the controller 1108 deletes the job whose acceptance is rejected from the job table.

The image processor 1000 processes input data as described above. Moreover, because the bidirectional interface 22 can perform multichannel communication as described above, it is possible to receive the job packet of a job control command while receiving the job packet of print data. Therefore, an advantage is obtained that the cancel control described later for FIG. 15 can be applied to a job currently received.

Figure 14:
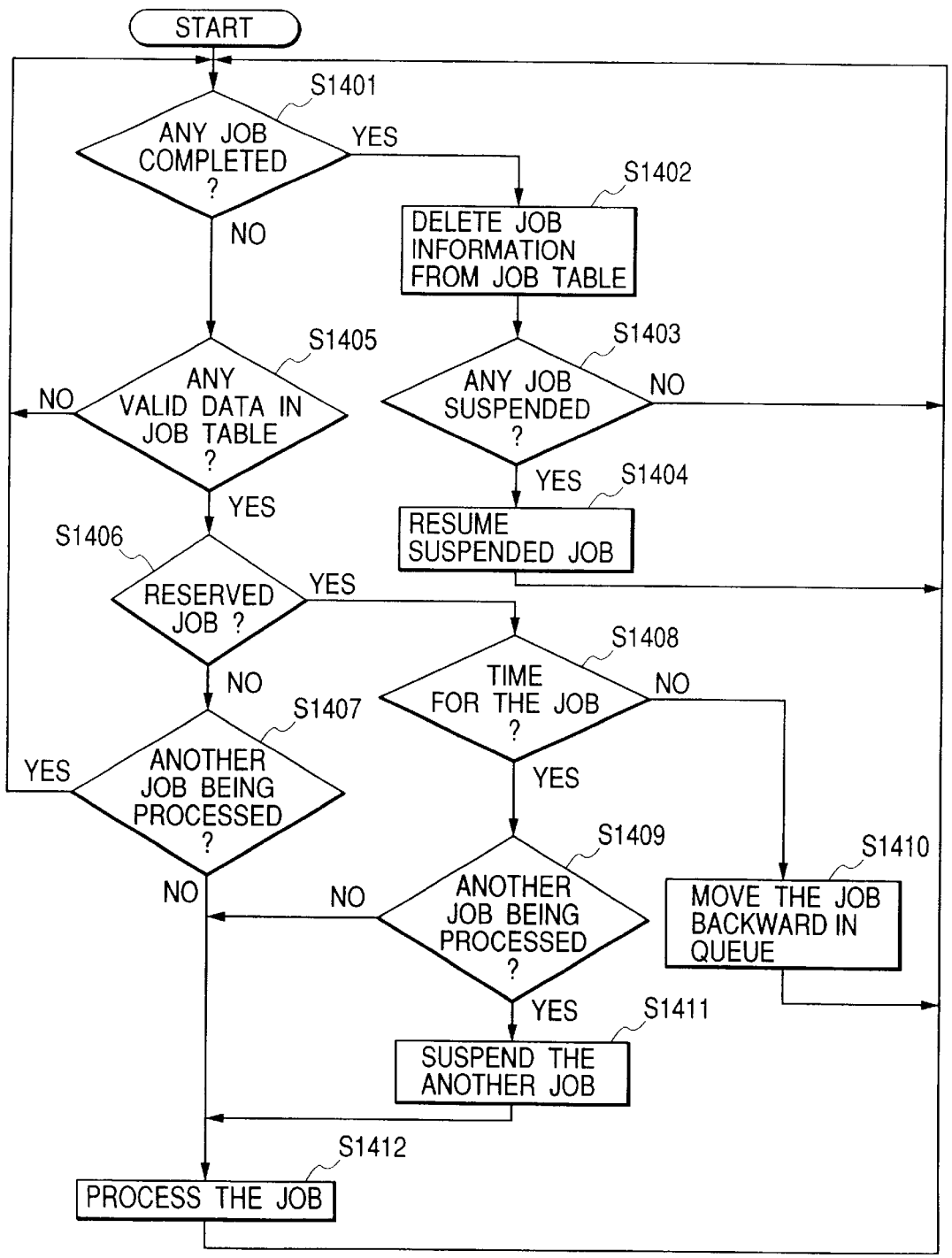
FIG. 14 is a schematic flow chart of an image processor currently printing in the second embodiment of the present invention.

FIG. 14 is a schematic flow chart under printing for executing a print job in an image processor of the present invention.

In step S1401, the information manager 1117 checks every piece of the job status information 1707 in a job table in the database 1109 to check whether a "completed" job is present.

When a "completed" job is not present, step S1405 is started. When a "completed" job is present, the information manager 1117 deletes the job information for a printed print job from a job table in the database 1109 in step S1402. Then, the manager 1117 releases a data area obtained in step S1412. In this case, the data area is an area occupied by the data for the print job (PDL data and intermediate data) in the input buffer 1111 and draw buffer 1113.

In step S1402, the information manager 1117 checks every piece of the job status information 1707 in a job table in the database 1109 to check whether a "suspended" job is present. When a suspended job is present, the manager 1117 restart the job and change the status of the job status information 1707 to "under analysis" or "under printing" which is a status before suspended.

In step S1405, the information manager 1117 checks whether valid data is present in the queue number 1702 of a job table in the database 1109. When valid data is present, the manager 1117 recognizes that data necessary for printing is prepared in the job table in FIG. 17 and step S1406 is started. A job with a queue number shows that it is already recognized and standby for printing.

In step S1406, the manager 1117 regards the job data to be first processed which can be recognized in accordance with the queue number as a processing object and checks the parameter list 1706 to check whether the job data is a reserved job. When the data is not a reserved job, step S1407 is started. When the data is a reserved job, step S1408 is started.

In step S1407, the manager 1117 checks whether an already processed job is present. When a job showing that the job status information 1707 in a job table is "currently analyzed" or "currently printed" is not present, step S1412 is started. When a job showing that the information 1707 is "currently analyzed" or "currently printed" is present, step S1401 is restarted to wait for completion of processing.

In step S1408, the manager 1117 checks a reserved time in accordance with the information in the parameter list 1706, compares the time with the time shown by the clock 21, and thereby determines the start of a job. In case of the start of a job is determined, step S1409 is started. In case of a time at which a job should not be started, step S1410 is started. In step S1410, the job queue number 1702 in the job management information of a job whose time is judged not to be started is changed and thereby, the job is moved backward by one in the queue.

In step S1409, the manager 1117 checks whether an already-processed job is present. When a job showing that the job status information 1707 in a job table is "currently analyzed" or "currently printed" is not present, step S1412 is started. When a job showing that the job status information 1707 is "currently analyzed" or "currently printed" is present, the manager 1117 stops the job "currently analyzed" or "currently printed" in step S1411, stores every job status and data currently processed in the RAM 19, and changes the job status information 1707 to "suspended." Thereafter, step S1412 is started.

When step S1412 is started, a currently-processed job is not present or it is suspended in the PDL analyzer 903. In this case, the processing of a job recognized as the top in the queue number 1702 is started. Specifically, the information manager 1117 transmits the job number of a job to be printed and a start command to the PDL translator 1112. Thereby, the information manager 1117 or PDL translator 1112 updates the job status information 1707 corresponding to a job number to which a job table in the database 1109 corresponds from "ready for printing" to "currently analyzed."

The PDL translator 1112 obtains the PDL data having a job number designated in step S1412 from the input buffer 1111, PDL-analyzes the PDL data to convert the data into intermediate data, and stores the data in the draw buffer 1113. After the intermediate data for one page is stored in the draw buffer 1113, the drawer 1114 starts a series of printing operations. That is, the drawer 1114 obtains the intermediate data from the draw buffer 1113, rasterizes the data to generate bit map data, and outputs the bit map data to the printer engine 1115. When a series of printing operations is started, the information manager 1117 or drawer 1114 updates the job status information 1707 corresponding to a job number to which a job table in the database 1109 corresponds from "currently analyzed" to "currently printed." Moreover, when printing for one page is completed, the information manager 1117 or drawer 1114 decrements the remaining number-of-page information (not illustrated) corresponding to a job number to which a job table in the database 1109 corresponds. Thus, printing for one page is performed. Thereafter, the information manager 1117 checks whether printing for all pages of a print job is completed. When the printing is not completed, the manager 1117 continuously prints continued pages. When printing of all pages ends, the information manager 1117 updates the status information of the printed print job to "end."

Figure 15:
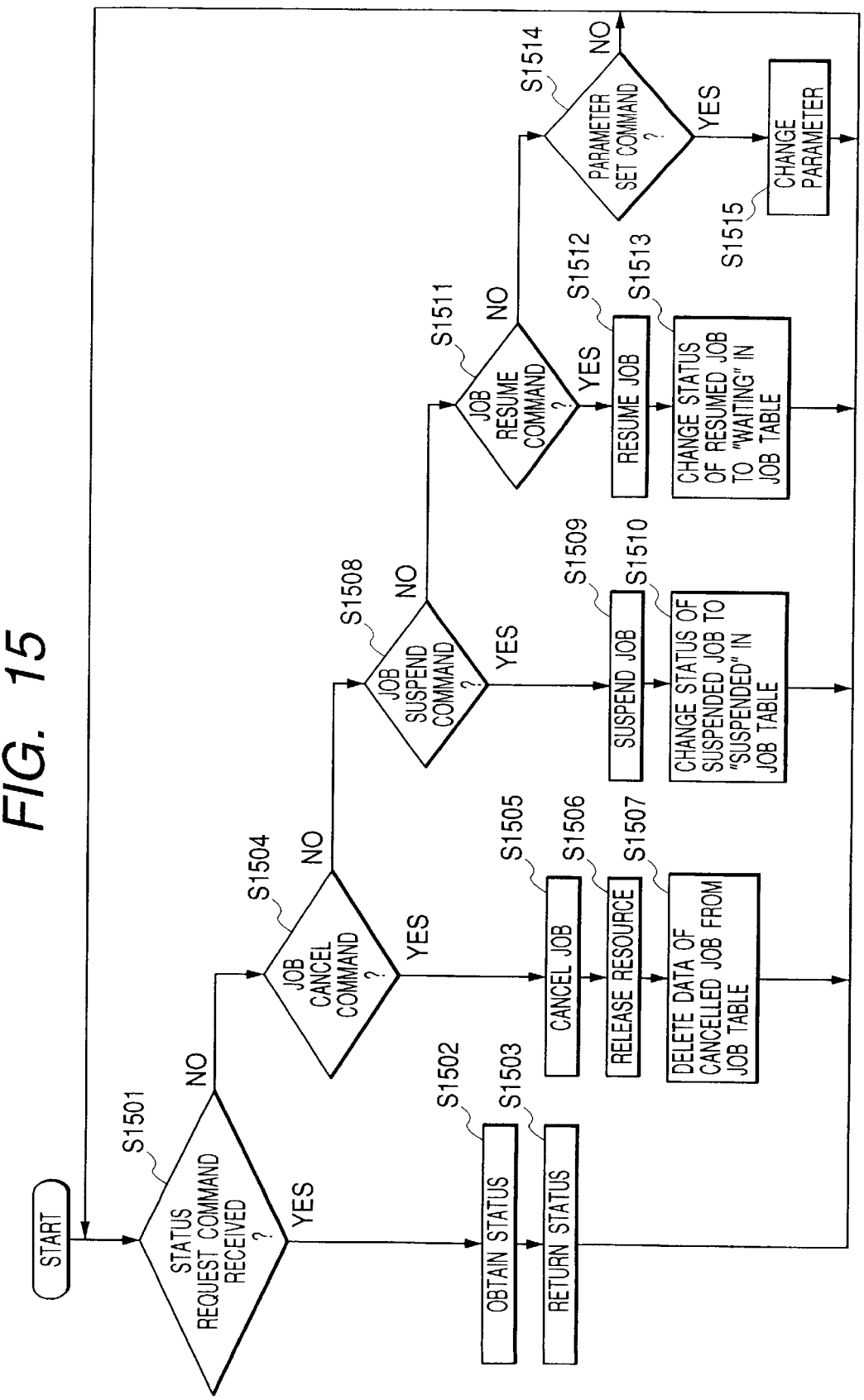
FIG. 15 is a flow chart showing job control by an image processor serving as a printing controller in the second embodiment of the present invention.

FIG. 15 is a flow chart showing job control by an image processor which is an example of a printing controller of the present invention, in which the processing in step S1318 in FIG. 13 is described in detail. The processing is performed by supplying a job control command to the information manager 1117 when the logic channel controller 1108 receives the job control command in step S1308.

A job control command is generated by the utility 1105 of the host computer 2000. The job control command includes a status-obtaining request command for requesting a jog list in an image processor, a job cancel command for requesting stop of a print job, a job suspending command for requesting the suspension of a print job, a job resuming command for requesting the resumption of a print job, and a parameter-setting change command for requesting the change of parameters of a print job. Each job control command is constituted of a job packet form and the attribute depends on the type of the command.

A job control function is not only provided by a job control command via the logic channel controller 1108 but also it is possible to issue the same command to the information manager 1117 from the operation panel 1012 on an image processor.

In step S1501, the information manager 1117 judges whether a received job control command is a status-obtaining request command in accordance with an attribute in a job packet. When it is judged that the received job control command is a status-obtaining request command, step S1502 is started.

In step S1502, the information manager 1117 obtains job tables from the database 1109. Then, in step S1503, the manager 1117 supplies the information for the job of each job table to the I/F driver 1116 via the logic channel controller 1108. The I/F driver 1116 converts the received information into a packet form and returns the information to the host computer 2000 through the communication medium 1118 comprising the IEEE 1284. By returning the information, the host computer 2000 can recognize a uniquely-assigned job number in the image processor 1000.

FIG. 16 shows a status monitor of the image processor 1000 to be displayed on a not-illustrated display unit of the host computer 2000. A job shown by "list in printer JOB" is a job currently processed in the image processor 1000. Conventionally, only a PDL-analyzed job can be seen. In the case of this embodiment, however, it is possible to recognize a status monitor of a job currently received.

When a user applies a job control (cancel, suspension, resumption, or setting change) to a certain job on the utility screen in FIG. 16, it is possible to select a desired job control by selecting a document with a pointing device such as a not-illustrated mouse on the utility screen. A job control command corresponding to the selected job control is generated by the utility 1105, job-packeted by the logic channel controller 1106 together with a specified job number, and transmitted to the image processor 1000. Because a job number uniquely assigned in the image processor 1000 can be obtained by returning a status request, a job control is realized.

In step S1501, when it is judged that a request is not a status-obtaining request step S1504 is started. In step S1504, the information manager 1117 judges whether a job control command is a job cancel command in accordance with an attribute in a job packet. When it is judged that the command is a job cancel command, step S1505 is started.

In step S1505, the information manager 1117 judges whether it has the power for canceling a job and thereafter cancels the job. First, the information manager 1117 obtains a job number in a job packet serving as a job cancel request transmitted from the host computer 2000 and judges that a user name of the job number is the same as a user name transmitting a job cancel command in accordance with the attribute ID of the job packet. When the user names are not the same, the manager 1117 does not cancel the job because it does not have a cancel power and skips the processings in steps 1502 and 1503. When the user names are the same, the manager 1117 obtains the job status information in a job table in the database 1109 corresponding to the job because it has a cancel power. The information manager 1117 controls job cancel in accordance with job status information. That is, when the job status information 1707 is "currently printed," the manager 1117 cancels the jobs at four places of a job preprocessor.

First, the manager 1117 outputs a job number and a job cancel designation to the job preprocessor 1110. The job preprocessor 1110 receives a job packet having a designated job number but it cancels subsequent job packets without transmitting them even if receiving them. Then, the information manager 1117 performs control so as to disable a corresponding print job in the input buffer 1111. The input buffer 1111 manages job numbers assigned by the job preprocessor 1110 together with each PDL data so as to be able to always grasp that which PDL data corresponds to which job number and so that the information manager 1117 can easily recognize the number of jobs to be canceled. Then, the information manager 1117 transmits a job number and a cancel command to the PDL translator 1112. When the PDL translator 1112 currently analyzes a job corresponding to a received job number, it stops PDL analysis in accordance with the cancel command. When the translator 1112 currently analyzes a job having a job number different from the received job number, it ignores the command. Then, the information manager 1117 transmits a job number and a cancel command to the drawer 1114. The drawer 1114 stops development of intermediate data in accordance with a cancel command if it currently draws a job corresponding to a received job number. However, while the drawer 1114 develops intermediate data different from the received job number, it continues processing until it receives intermediate data having a specified job number.

When job status information is "currently processed," the information manager 1117 sends a job cancel command to the PDL translator 1112 and then, step S1506 is started. When job status information is "standby for printing," the information manager 1117 completes job canceling in the input buffer 1111 and then, step S1506 is started.

Thus, job cancel control is performed in the image processor 1000 in accordance with a state of a job. Moreover, job cancel is stopped from the side closer to the I/F driver 1116, that is, the upstream side of a data flow. This is because, if jobs are canceled from the side closer to a printer engine, data flows when cancel shifts and thereby, data which cannot be deleted remains. Data is deleted from the upstream side, thereby job can be completely controlled.

When a canceled job is a reserved job, a reserved resource is released in step S1506. When a reservation having a canceled job number is present in a resource table 1800, the job number is deleted.

Then, in step S1507, the information manager 1117 deletes all pieces of information for canceled print jobs from job tables in the database 1109.

When it is judged in step S1504 that a job should not be canceled, the processing in step S1508 is started. In step S1508, the information manager 1117 judges whether a job control command is a job suspension command in accordance with an attribute in a job packet. When it is judged that the job control command is a job suspension command, the processing in step S1509 is started.

In step S1509, the information manager 1117 performs job suspension control. Job suspension control and power judgment are the same as the above job cancel control in flow and temporary saving is performed instead of cancel (deletion). The data to be saved in this case is only the PDL data stored in the input buffer 1111 but intermediate data is deleted.

Then, in step S1510, the information manager 1117 updates the status information 1707 for a suspended print job in a job table in the database 1109 to "suspension."

When it is judged that a job is not suspended in step S1508, step S1511 is started. In step S1511, the information manager 1117 judges whether a job control command is a job resumption command in accordance with an attribute in a job packet. When it is judged that the job control command is a jog resuming command, step S1512 is started.

In step S1512, the information manager 1117 performs job-resumption power judgment and job resumption control. The job-resumption power judgment is performed by comparing a user name in a job table corresponding to a job number with a user name shown by an attribute ID of a job-resuming job packet similarly to the case of the above job cancel judgment. Job resumption control is performed by returning a job suspended due to the above-described job suspension control to the normal printing routine. That is, the PDL data for a print job temporarily saved in a nonvolatile recording medium such as a hard disk is only returned to the input buffer 1111 together with a job number. Thereby, it is possible to resume a print job.

Then, in step S1513, the information manager 1117 updates the status information 1707 for a resumed print job in a job table in the database 1109 to "standby for printing."

When it is judged in step S1511 that a job is not resumed, step S1514 is started. In step S1514, the information manager 1117 judges whether a job control command is a parameter-setting change command in accordance with an attribute in a job packet. When it is judged that the job control command is a parameter-setting change command, step S1515 is started.

In step S1515, the information manager 1117 performs parameter-setting-change power confirmation and parameter-setting change control. The parameter-setting-change power confirmation is also performed similarly to the power confirmation when resuming a job. The information manager 1117 changes a parameter list handle 1706 in a job table in the database 1110 in accordance with an obtained parameter-setting change command. The parameter list handle 1706 includes the number of sheets to be printed, a color mode, and a reserved time zone. By changing these values, actual printing mode, number of sheets to be printed, and job reserved-time zone are changed.

For the above second embodiment, a case is described in which a job attribute such as a reserved time is added to a print job and generated and transmitted from the host 3000 to the image processor 1000. Then, a case is described below in which a reservation is set to the image processor 1000 before issuing a print job similarly to the case of the first embodiment. In case of the second embodiment, however, a user is not reserved but a job, that is, a print-job file is reserved.

Figure 22:
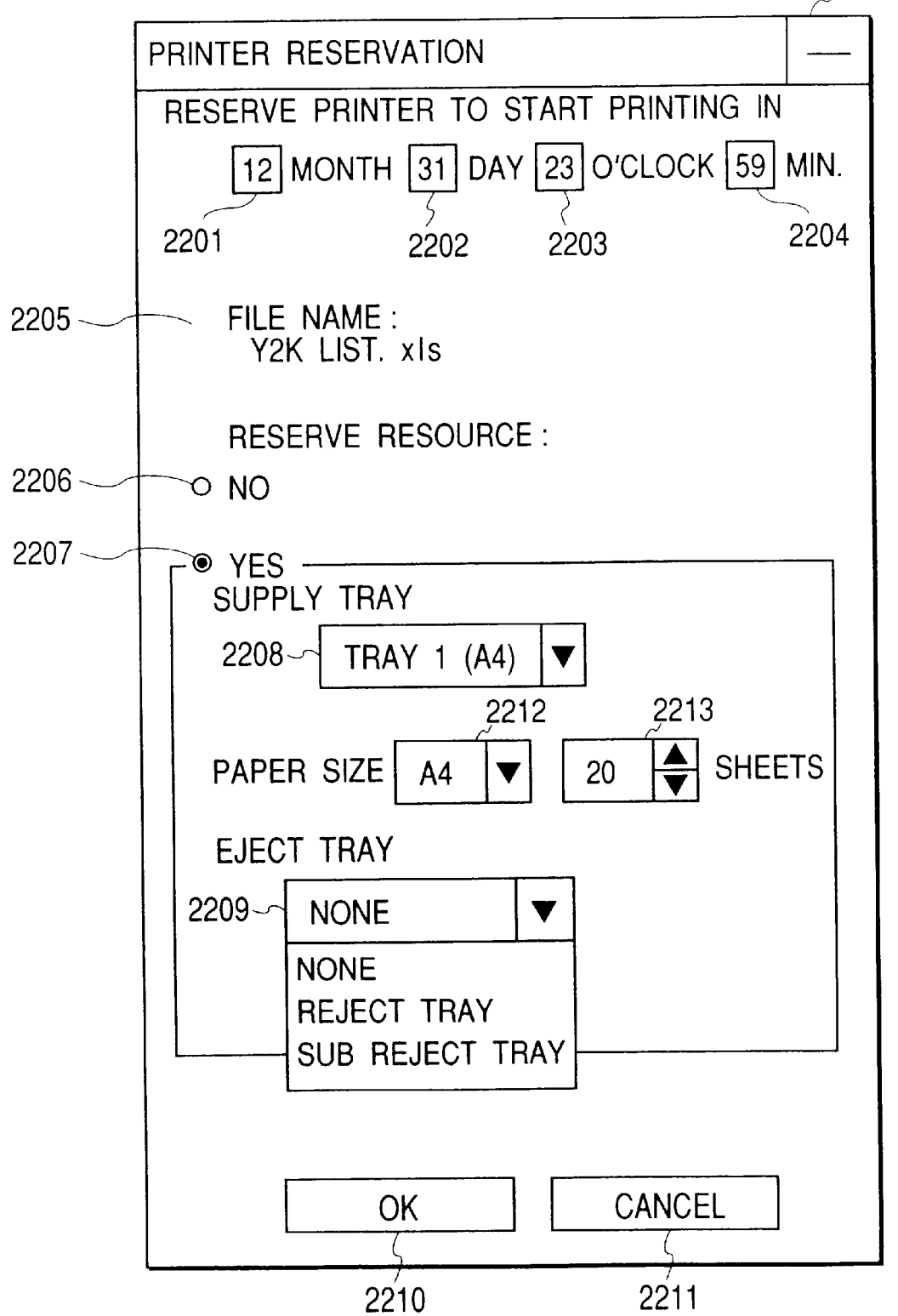
FIG. 22 is an illustration showing a reservation dialog displayed on the host side when setting methods for time reservation and job control in the second embodiment of the present invention.

FIG. 22 shows a time reservation dialog displayed on the CRT 10 of the host computer 2000 in accordance with a reservation setting utility of the host computer 2000 when specifying a file name to reserve a time in this embodiment. The reservation dialog of the reservation setting utility can be also set from the operation panel 1012 not from the host computer.

Symbols 2201 to 2204 denote designation means for inputting the date and time for starting a reserved time zone.

Symbol 2205 denotes a file name to be printed.

Symbols 2206 and 2207 denote alternative radio buttons. When the button 2206 is selected, a resource is not reserved. When a reserved time comes, the image processor 1000 starts a job processing. However, when the number of resources is insufficient, outputs are not assured. However, when the button 2207 is selected, outputs in a reserved time zone are assured. However, reserved resources cannot be used by other job. When 2207 is selected and the reservation of resources is specified, it is possible to set 2208, 2209, 2212, and 2213. Symbol 2208 denotes designation means for designating a sheet feed tray for securing sheets. Symbol 2212 denotes a sheet size and 2213 denotes specifying means for specifying the number of recording sheets to be secured. Symbol 2209 denotes designation means for setting a reserved-job sheet feed tray. Before a specified sheet ejection stray is filled, job control is performed in the image processor 1000. Symbol 2210 denotes an OK button and 2211 denotes a cancel button.

When the OK button 2210 is pressed, the host computer 2000 generates reservation setting information in accordance with the information set by a user interface 1900 of the reservation setting utility and transmits the reservation setting information to the image processor 1000 through the bidirectional communication medium 22 (network). When the image processor 1000 receives reservation setting information from the host computer 2000, the CPU 12 analyzes the information to judge whether a specified time zone is a reserved time zone of other user. When it is judged that a reservation is not received from other user, the CPU 12 sets the reservation and stores the information in the external memory 14. When a reservation is received from other user, the CPU 12 does not accept the reservation but it communicates that the reservation is not accepted to the host computer 2000 transmitting reservation setting information. The image processor 1000 performs reservation setting in accordance with the reservation setting information and analyzes source-reserving information included in the reservation setting information to secure resources.

When a sheet feed tray 1008 of the image processor 1000 has a number-of-sheets detection sensor 1016 for counting the remaining number of sheets, it is possible for a resource reservation to have a function for assuring a specified number-of-sheets output of a reserved job. When job data is unfinished at the point of time of making a reservation and the output number of sheets may change before a reserved time, it is possible to specify a reserved sheet size and the reserved number of sheets from the sheet-size specifying means 2212 (or 1911 in FIG. 19) and number-of-sheets specifying means 2213 (or 1912 in FIG. 19) of a reservation setting dialog 2200.

In this case, the printer 1000 controls other job so that the remaining number of sheets in the sheet feed tray 1008 is not less than a reserved number of sheets. Specifically, when the image processor 1000 receives reservation setting information, it detects the number of sheets in a specified sheet feed tray by the number-of-sheets detection sensor 1016 and compares the remaining number of sheets with the number of sheets to be secured specified in accordance with the reservation setting information. When the number of sheets to be secured is larger than the remaining number of sheets, the image processor 1000 communicates that the number of resources is insufficient to the host computer 2000 transmitting the reservation setting information to the image processor 1000. When the remaining number of sheets is larger than the number of sheets to be secured, the image processor 1000 communicates that it received the reservation to the host computer 2000. Moreover, the image processor 1000 subtracts the number of sheets to be secured from the remaining number of sheets to obtain the difference number of sheets but it does not accept jobs equal to or more than the difference number of sheets or does not process the jobs even if accepting the jobs until a job of a file specified by the file-name specifying means 2205.

When an image processor includes a sheet securing unit (corresponding to the intermediate tray 2320 in FIG. 23) not illustrated in FIG. 1, the number of sheets set in the image processor is stored in the sheet securing unit. The sheet-securing unit can be also realized by temporarily using a both-side printing unit of an existing image processor. The sheets secured in the sheet-securing unit are used for a reserved print job. After a reserved time expires or a specified job is completed, the sheets are released from the reserved state, handled as the sheets in a sheet feeder, and used for other job. Moreover, a memory capacity is similarly released and used for other job.

In case of the control of the image processor 1000 of the second embodiment, the CPU 12 judges in S305 in FIG. 3 whether a job is a print job of a reserved file name instead of judging whether the job is a reserver's job. When the job is a job of a specified file name, S306 is started and the image processor 1000 processes an image by using a secured recording sheet and memory.

Thus, in case of the second embodiment, it is possible to specify a file name and designate an image processor to reserve a resource to the file before issuing a print job. Therefore, it is prevented that the number of resources is insufficient and thereby job control cannot be made when issuing a print job.

Moreover, because only a job having a specified file name is reserved, a specified user cannot entirely reserve a certain time zone. Therefore, it is decreased that the frequency for other user to feel inconvenient decreases and it is possible to efficiently operate an image processor requested by a plurality of users.

<Other Embodiment>

The present invention can be applied to a system comprising a plurality of units (such as, a host computer, interface unit, reader, and printer) or an apparatus comprising one unit (such as a copying machine or facsimile device).

Moreover, it is needless to say that an object of the present invention can be attained by supplying a recording medium (storing medium) storing a program code of software for realizing functions of the above-described embodiments to a system or an apparatus and reading and executing the program code from the recording medium by a computer (or CPU or MPU) of the system or apparatus.

In this case, the program code read from the recording medium realizes each of the above embodiments and the recording medium storing the program code configures the present invention.

A recording medium for storing the program code or variable data such as a table can use any one of a floppy disk (FD), hard disk, optical disk, photomagnetic disk, CD-ROM, CD-R, magnetic tape, nonvolatile memory card (IC memory card), and ROM.

Moreover, it is needless to say that a case is also included in which a program code read by a computer is executed and thereby, not only the functions of the above embodiments are realized but also an OS (Operating System) working on the computer performs a part of the whole of actual processing in accordance with a designation of the program code, and the functions of the above embodiments are realized through the processing.

Furthermore, to realize functional processings of the present invention by a computer, a program code installed in the computer also realizes the present invention. That is, claims of the present invention include a computer program for realizing functional processings of the present invention. The computer program can be supplied by not only storing the computer program in the above FD or CD-ROM and reading the program by a computer to install the program in the computer but also using a browser of a client computer and thereby, connecting with a home page of Internet, and down-loading a computer program of the present invention or a file compressed and including an automatic installing function from the home page. Furthermore, the functional processings can be realized by dividing a program code constituting a program of the present invention into a plurality of files and down-loading the files from different home pages. That is, a WWW server for making a plurality of users down-load a program file for realizing functional processings of the present invention by a computer is included in claims of the present invention.

Furthermore, the functional processings can be realized by enciphering a program of the present invention, storing a storing medium such as an FD, distributing the FD to users, making users down-load the key information for solving the enciphered program from a home page through Internet, using the key information and thereby executing the enciphered program, and installing the program in a computer.

As described above, according to this embodiment, an image processor shared by a plurality of users makes it possible for a specified user to use a printer preferentially to other users in a reserved time zone reserved by the user as a future use time.

Moreover, according to the present invention, a reserver can select either of a mode for rejecting every job other than a job of the reserver and a mode for also processing a job other than a job of the reserver though most preferentially processing the job of the reserver when the reserver sets a job control content in a reserved time zone.

Furthermore, according to the present invention, it is possible to communicate the start and end of a reserved time and a remaining reserved time to a reserver, communicate that a job of a party other than the reserver would be processed in a reserved time zone to the reserver and a job generator, and communicate that no processing is performed in a reserved time zone to a job generator when rejecting a job of a party other than a reserver.

Furthermore, according to the present invention, in a mode for processing a job of a party other than a reserver in a reserved time zone, it is possible to perform the exception setting for making it possible to reject a job of a party other than the reserver, having a necessary printing time exceeding a certain length and the job control setting for making it possible to process a job of a party other than the reserver, having a necessary printing time exceeding a certain length by dividing the job into jobs respectively having an optional size.

Furthermore, according to the present invention, it is possible to estimate a time necessary a job to be processed before a reserved time and apply job control in a reserved time zone to a job that cannot be completed before the reserved time.

Furthermore, according to the present invention, it is possible to suspend a job other than a reserved job in a set reserved time and execute the interrupt of the reserved job.

Furthermore, according to the present invention, it is possible to communicate the start and end of a reserved job to a reserver, communicate that processing is suspended to a job generator when suspending a job of a party other than the reserver being processed in a reserved time zone, and communicate that a reserved job is currently processed to a job generator when accepting a job of a party other than the reserver in a reserved time zone.

Furthermore, according to the present invention, it is possible to estimate a time required for job processing by previously analyzing a reserved job and complete printing of the reserved job when a reserved time zone expires.

Furthermore, according to the present invention, when a reserved time approaches and an image processor is in a power saving state, it is possible to make the image processor automatically perform the warm-up operation so that printing can be immediately performed in a reserved time zone.

Furthermore, according to the present invention, it is possible to previously secure resources scheduled to be used for a job of a reserver in a reserved time, set the total number of resources to be secured by a reserver, and use resources secured but not used from other job after a reserved time expires.

Furthermore, according to the present invention, it is possible to reserve resources without analyzing job data at the printer side by receiving the setting about resources to be secured while the setting is attached to job data.

Furthermore, according to the present invention, it is possible to automatically generate the setting about resources to be secured by a reserved job by using job data.

Furthermore, according to the present invention, it is possible to freely set the setting about resources to be secured by a reserved job independently of job data.

Furthermore, according to the present invention, it is possible to automatically generate the setting about resources to be secured by a reserved job by analyzing the job data when the setting is not attached to the job data.

Furthermore, according to the present invention, it is possible to overwrite and reset various settings about a reserved job and a reservation until a reserved time zone approaches.

As described above, according to the present invention, an advantage is obtained that a printer can be reserved even if no job is generated.

Moreover, according to the present invention, an advantage is obtained that a reserved job can be securely processed by making it possible to reserve resources used for the reserved job.

Furthermore, according to the present invention, an advantage is obtained that a job of a reserver can be preferentially processed in a reserve time zone by making only a specified user use a certain time zone and excluding jobs of other users.

As many apparently widely different embodiments of the present invention can be made without departing from the spirit and scope thereof, it is to be understood that the invention is not limited to the specified embodiments thereof except as defined in the appended claims.

What is claimed is:

1. An image processor to be shared by a plurality of users, comprising:

first setting means for reserving and setting a job-processing time zone for a job of a reserver;

second setting means for setting a job control mode for one or more jobs of a user other than the reserver in the reserved time zone; and job control means for processing the job of the reserver preferentially to the one or more jobs of the other user in the reserved time zone, in accordance with settings by said first and second setting means, wherein the job control mode set by said second setting means includes a first control mode, in which the job of the reserver is processed but the one or more jobs of the other user are rejected, and a second control mode, in which the job of the reserver is preferentially processed and the one or more jobs of the other user are processed, and wherein either one of the first and second control modes may be selected.

2. The image processor according to claim 1, wherein the second control mode includes an exception setting mode for not processing a job of a user other than the reserver having a predetermined necessary printing time or a job exceeding a length set by the reserver in the reserved time zone, and a job dividing and setting mode for dividing a job of a user other than the reserver having a predetermined necessary printing time or a job having a length exceeding the length set by the reserver into jobs having a predetermined size or a size set by the reserver and processing the divided jobs, and wherein a user may select either of the exception setting mode and the job dividing and setting mode.

3. The image processor according to claim 1, further comprising:

first communicating means for communicating a reserved time to the reserver;

second communicating means for communicating that processing is performed to the reserver and a job generator, when controlling a job of a user other than the reserver in the reserved time zone; and third communicating means for communicating that no processing is performed to the job generator, when rejecting a job of a user other than the reserver in the reserved time zone, and for communicating that a job may be accepted to the job generator, when the job of the reserver is completed.

4. The image processor according to claim 3, wherein communications by each of said first, second, and third communicating means is performed through each user's host system connected to said image processor.

5. The image processor according to claim 1, wherein said job control means estimates a processing time necessary for a job to be processed before the reserved time zone and applies the job control mode in the reserved time zone set by said second setting means to a job that cannot be completed before the reserved time zone, in accordance with the estimated processing time.

6. The image processor according to claim 1, wherein, in the reserved time zone, said job control means suspends an unreserved job currently being processed and causes a reserved job to be processed as an interrupt process.

7. The image processor according to claim 1, wherein said job control means judges whether said image processor for which the reserved time zone approaches is in a power saving state and, when said image processor is in the power saving state, automatically performs a warm-up operation so that printing may be immediately performed in the reserved time zone.

8. The image processor according to claim 1, further comprising:
   third setting means for performing a setting for securing resources scheduled to be used for the job of the reserver in a reserved time zone and for performing a setting of a total number of resources to be secured for the reserver;
   resource securing means for securing the resources scheduled to be used for the job of the reserver in the reserved time zone, in accordance with the settings by said third setting means, and
   resource cancel means for canceling secured remaining resources not used though secured, in accordance with the settings by said third setting means, so that the remaining resources may be used for another job.

9. The image processor according to claim 8, wherein setting information about resources to be secured arrives together with a job in a form that permits obtaining of print data without requiring analyzing of the print data.

10. The image processor according to claim 1, further comprising update means for updating various settings about a reserved job and a reservation until the reserved time zone approaches.

11. The image processor according to claim 1, wherein the settings by each of said first and second setting means are performed in accordance with information inputted from each user's host system connected to said image processor.

12. The image processor according to claim 1, wherein the settings by each of said first and second setting means is performed in accordance with information inputted from an operation panel of said image processor.

13. An information processor that communicates with an image processor, said comprising:
   reservation means for reserving a job to be processed in a certain time zone to the image processor; and
   setting means for setting a job control mode for an unreserved job by the image processor in the reserved time zone,
   wherein the job control mode set by said setting means includes a first control mode, in which a job of a reserver is processed but one or more jobs of a user other than the reserver are rejected, and a second control mode, in which the job of the reserver is preferentially processed and the one or more jobs of the other user are processed, and
   wherein either one of the first and second control modes may be selected.

14. The information processor according to claim 13, wherein said setting means selects a designation for setting the image processor so as not to accept an unreserved job in the reserved time zone.

15. A method for controlling an image processor to be shared by a plurality of users, comprising:
   a first setting step of reserving and setting a job-processing time zone for a job of a reserver;
   a second setting step of setting a job control mode for one or more jobs of a user other than the reserver in the reserved time zone; and
   a job control step of processing the job of the reserver preferentially to the one or more jobs of the other user in the reserved time zone, in accordance with settings in said first and second setting steps,
   wherein the job control mode set in said second setting step includes a first control mode, in which the job of the reserver is processed but the one or more jobs of the other user are rejected, and a second control mode, in which the job of the reserver is preferentially processed and the one or more jobs of the other user are processed, and
   wherein either one of the first and second control modes may be selected.

16. A method according to claim 15, wherein the second control mode includes an exception setting mode for not processing a job of a user other than the reserver having a predetermined necessary printing time or a job exceeding a length set by the reserver in a reserved time zone, and a job dividing and setting mode for dividing a job of a user other than the reserver having a predetermined necessary printing time or a job having a length exceeding the length set by the reserver into jobs having a predetermined size or a size set by the reserver and processing the divided jobs, and
   wherein a user may select either of the exception setting mode and the job dividing and setting mode.

17. A method according to claim 15, further comprising:
   a first communicating step of communicating a reserved time to the reserver;
   a second communicating step of communicating that processing is performed to the reserver and a job generator, when controlling a job of a user other than the reserver in the reserved time zone; and
   a third communicating step of communicating that no processing is performed to the job generator, when rejecting a job of a user other than the reserver in the reserved time zone, and of communicating that a job may be accepted to the job generator, when the job of the reserver is completed.

18. A method according to claim 17, wherein communications in each of said first, second, and third communicating steps are performed through each user's host system connected to the image processor.

19. A method according to claim 15, wherein said job control step estimates a processing time necessary for a job to be processed before the reserved time zone and applies the job control mode in the reserved time zone set in said second setting step to a job that cannot be completed before the reserved time zone, in accordance with the estimated processing time.

20. A method according to claim 15, wherein, in the reserved time zone, said job control step suspends an unreserved job currently being processed and causes a reserved job to be processed as an interrupt process.

21. A method according to claim 15, wherein said job control step judges whether the image processor for which the reserved time zone approaches is in a power saving state and, when the image processor is in the power saving state, automatically performs a warm-up operation so that printing may be immediately performed in the reserved time zone.

22. A method according to claim 15, further comprising:
a third setting step of performing a setting for securing resources scheduled to be used for the job of the reserver in the reserved time zone and of performing a setting of a total number of resources to be secured by the reserver;
a resource securing step of securing the resources scheduled to be used for the job of the reserver in the reserved time zone, in accordance with the settings in said third setting step; and
a resource cancel step of canceling secured remaining resources not used though secured, in accordance with the settings in said third setting step so that the remaining resources may be used for another job.

23. A method according to claim 15, wherein setting information about resources to be secured arrives together with a job in a form that permits obtaining of print data without requiring analyzing of the print data.

24. A method according to claim 15, further comprising an update step of updating various settings about a reserved job and a reservation until the reserved time zone approaches.

25. A method according to claim 15, wherein the settings in each of said first and second setting steps are performed in accordance with information inputted from each user's host system connected to the image processor.

26. A method according to claim 15, wherein the settings in each of said first and second setting steps are performed in accordance with the information inputted from an operation panel of the image processor.

27. A method for controlling an information processor for communicating with an image processor, comprising:
a reservation step of reserving a job to be processed in a certain time zone to the image processor; and
a setting step of setting a job control mode for an unreserved job by the image processor in the reserved time zone,
wherein the job control mode set in said setting step includes a first control mode, in which a job of a reserver is processed but one or more jobs of a user other than the reserver are rejected, and a second control mode, in which the job of the reserver is preferentially processed and the one or more jobs of the other user are processed, and
wherein either one of the first and second control modes may be selected.

28. A method according to claim 27, wherein said setting step selects a designation for setting the image processor so as not to accept an unreserved job in the reserved time zone.

29. A computer-readable memory medium storing a program for implementing a method of controlling an image processor to be shared by a plurality of users, the method comprising:
a first setting step of reserving and setting a job-processing time zone for a job of a reserver;
a second setting step of setting a job control mode for one or more jobs of a user other than the reserver in the reserved time zone; and
a job control step of processing the job of the reserver preferentially to the one or more jobs of the other user in the reserved time zone, based on settings in said first and second setting steps,
wherein the job control mode set in said second setting step includes a first control mode, in which the job of the reserver is processed but the one or more jobs of the other user are rejected, and a second control mode, in which the job of the reserver is preferentially processed and the one or more jobs of the other user are processed, and
wherein either one of the first and second control modes may be selected.

30. A memory medium according to claim 29,
wherein the second control mode includes an exception setting mode for not processing, in the reserved time zone, a job of a user other than the reserver having a predetermined necessary printing time or a job exceeding a length set by the reserver, and a job dividing and setting mode for dividing a job of a user other than the reserver having a predetermined necessary printing time or a job having a length exceeding the length set by the reserver into jobs having a predetermined size or a size set by the reserver and processing the divided jobs, and
wherein a user may select either of the exception setting mode and the job dividing and setting mode.

31. A memory medium according to claim 29, wherein the method further comprises:
a first communicating step of communicating a reserved time to the reserver;
a second communicating step of communicating, if a job of a user other than the reserver is to be controlled in the reserved time zone, that the job of the user other than the reserver will be processed to the reserver and a job generator; and
a third communicating step of communicating, if a job of a user other than the reserver is to be rejected in the reserved time zone, that the job of the user other than the reserver will not be performed to a job generator, and for communicating that a job may be accepted to the job generator when the job of the reserver is completed.

32. A memory medium according to claim 31, wherein communications in each of said first, second, and third communicating step are performed through a host system of each user that is connected to the image processor.

33. A memory medium according to claim 29, wherein said job control step estimates a processing time necessary for a job to be processed before the reserved time zone, and applies the job control mode in the reserved time zone set in said second setting step to a job that cannot be completed before the reserved time zone, based on the estimated processing time.

34. A memory medium according to claim 29, wherein, in the reserved time zone, said job control step suspends an unreserved job currently being processed and causes a reserved job to be processed as an interrupt process.

35. A memory medium according to claim 29, wherein said job control step judges, when the reserved time zone is approaching, whether the image processor is in a power saving state, and, if the image processor is in the power saving state, automatically performs a warm-up operation so that printing may immediately be performed in the reserved time zone.

36. A memory medium according to claim 29, wherein the method further comprises:
a third setting step of performing a setting for securing resources scheduled to be used for the job of the reserver in the reserved time zone and for performing a setting of a total amount of resources to be secured for the reserver;

a resource securing step of securing the resources scheduled to be used for the job of the reserver in the reserved time zone, based on settings in said third setting step; and a resource cancel step of canceling secured remaining resources not used though secured, based on the settings in said third setting step, so that the remaining resources may be used for other jobs.

37. A memory medium according to claim 29, wherein setting information about resources to be secured is sent together with a job in such a form that print data may be obtained without analysis of the print data.

38. A memory medium to claim 29, wherein the method further comprises an update step of updating various settings about a reserved job and a reservation until the reserved time zone arrives.

39. A memory medium to claim 29, wherein the settings in each of said first and second setting steps is made based on information that is inputted from a host system of each user that is connected to the image processor.

40. A memory medium according to claim 29, wherein the settings in each of said first and second setting steps is made based on information that is inputted through an operation panel of the image processor.

41. A computer-readable memory medium storing a program for implementing a method of controlling an information processor that communicates with an image processor, the method comprising:

a reservation step of reserving a job to be processed in a certain time zone to the image processor; and a setting step of setting a job control mode of the image processor for an unreserved job in the time zone, wherein the job control mode set in said setting step includes a first control mode, in which a job of a reserver is processed but one or more jobs of a user other than the reserver are rejected, and a second control mode, in which the job of the reserver is preferentially processed and the one or more jobs of the other user are processed, and wherein either one of the first and second control modes may be selected.

42. A memory medium according to claim 41, wherein said setting step selects an instruction to make a setting in which the image processor does not accept an unreserved job in the time zone.

43. A program product embodying a program for implementing a method of controlling an image processor to be shared by a plurality of users, the method comprising:

a first setting step of reserving and setting a job-processing time zone for a job of a reserver;

a second setting step of setting a job control mode for one or more jobs of a user other than the reserver in the reserved time zone; and a job control step of processing the job of the reserver preferentially to the one or more jobs of the other user in the reserved time zone, based on settings in said first and second setting steps, wherein the job control mode set in said second setting step includes a first control mode, in which the job of the reserver is processed but the one or more jobs of the other user are rejected, and a second control mode, in which the job of the reserver is preferentially processed and the one or more jobs of the other user are processed, and wherein either one of the first and second control modes may be selected.

44. A program product according to claim 43, wherein the second control mode includes an exception setting mode for not processing, in the reserved time zone, a job of a user other than the reserver having a predetermined necessary printing time or a job exceeding a length set by the reserver, and a job dividing and setting mode for dividing a job of a user other than the reserver having a predetermined necessary printing time or a job having a length exceeding the length set by the reserver into jobs having a predetermined size or a size set by the reserver and processing the divided jobs, and wherein a user may select either of the exception setting mode and the job dividing and setting mode.

45. A program product according to claim 43, wherein the method further comprises:

a first communicating step of communicating a reserved time to the reserver;

a second communicating step of communicating, if a job of a user other than the reserver is to be controlled in the reserved time zone, that the job of the user other than the reserver will be processed to the reserver and a job generator; and a third communicating step of communicating, if the job of the user other than the reserver is to be rejected in the reserved time zone, that the job of the user other than the reserver will not be performed to a job generator, and for communicating that a job may be accepted to the job generator, when the job of the reserver is completed.

46. A program product according to claim 45, wherein communications in each of said first, second, and third communicating steps are performed through a host system of each user that is connected to the image processor.

47. A program product according to claim 43, wherein said job control step estimates a processing time necessary for a job to be processed before the reserved time zone, and applies the job control mode in the reserved time zone set in said second setting step to a job that cannot be completed before the reserved time zone, based on the estimated processing time.

48. A program product according to claim 43, wherein, in the reserved time zone, said job control step suspends an unreserved job currently being processed and processes the reserved job as an interrupt process.

49. A program product according to claim 43, wherein said job control step judges, when the reserved time zone is approaching, whether the image processor is in a power saving state, and, if the image processor is in the power saving state, automatically performs a warm-up operation so that printing may immediately be performed in the reserved time zone.

50. A program product according to claim 43, wherein the method further comprises:

a third setting step of performing a setting for securing resources scheduled to be used for the job of the reserver in the reserved time zone and for performing a setting of a total amount of resources to be secured for the reserver;

a resource securing step of securing the resources scheduled to be used for the job of the reserver in the reserved time zone, based on the settings in said third setting step; and a resource cancel step of canceling secured remaining resources not used though secured, based on the settings in said third setting step, so that the remaining resources may be used for other jobs.

51. A program product according to claim 43, wherein setting information about resources to be secured is sent together with a job in such a form that print data may be obtained without analysis of the print data.

52. A program product according to claim 43, wherein the method further comprises an update step of updating various settings about the reserved job and a reservation until the reserved time zone arrives.

53. A program product according to claim 43, wherein the settings in each of said first and second setting steps are made based on information that is inputted from a host system of each user that is connected to the image processor.

54. A program product according to claim 43, wherein the settings in each of said first and second setting steps is made based on information that is inputted through an operation panel of the image processor.

55. A program product embodying a program for implementing a method of controlling an information processor that communicates with an image processor, the method comprising:

a reservation step of reserving a job to be processed in a certain time zone to the image processor; and a setting step of setting a job control mode of the image processor for an unreserved job in the time zone, wherein the job control mode set in said setting step includes a first control mode, in which a job of a reserver is processed but one or more jobs of a user other than the reserver are rejected, and a second control mode, in which the job of the reserver is preferentially processed and the one or more jobs of the other user are processed, and wherein either one of the first and second control modes may be selected.

56. A program product according to claim 55, wherein said setting step selects an instruction to make a setting in which the image processor does not accept an unreserved job in the time zone.

* * * * *

UNITED STATES PATENT AND TRADEMARK OFFICE
CERTIFICATE OF CORRECTION

PATENT NO. : 6,785,727 B1
DATED : August 31, 2004
INVENTOR(S) : Masahito Yamazaki It is certified that error appears in the above-identified patent and that said Letters Patent is hereby corrected as shown below:

Drawings,
Sheet 6, Fig. 9, "ANALYSER" should read -- ANALYZER --,
Sheet 10, Fig. 13, "PRE-PRECESSOR" should read -- PRE-PROCESSOR --.
Sheet 15, Fig. 20, "RECEIVED" should read -- RESERVED --.

Column 1,
Line 53, "starts" should read -- start --.

Column 2,
Line 46, "staring" should read -- starting --.

Column 3,
Line 21, "other" (first occurrence) should read -- another --.
Line 24, "shown" should read -- showing --.
Line 33, "view" should read -- view of --.
Line 43, "or" should be deleted.
Line 56, "invent" should read -- invention --.
Line 66, "form" should read -- forms --.

Column 5,
Line 17, "reverse" should read -- reverses --.

Column 6,
Line 55, "get," should read -- Get, --.

Column 8,
Line 33, "other" should read -- the other --.

Column 11,
Line 28, "develops" should read -- develop --.
Line 44, "diving" should read -- dividing --.

Column 12,
Line 50, "transmitted" should read -- transmitting --.
Line 63, "wait." should read -- waits. --.

Column 13,
Line 19, "use" should read -- to use --.

UNITED STATES PATENT AND TRADEMARK OFFICE
CERTIFICATE OF CORRECTION

PATENT NO. : 6,785,727 B1
DATED : August 31, 2004
INVENTOR(S) : Masahito Yamazaki It is certified that error appears in the above-identified patent and that said Letters Patent is hereby corrected as shown below:

Column 15,
Line 22, "supplied" should read -- supplies --.

Column 18,
Line 1, "s1005," should read -- S1005, --.

Column 19,
Line 23, "every" should read -- of every --.
Line 35, "1008" should read -- 1008, --.

Column 20,
Line 12, "restart" should read -- restarts --; and "change" should read -- changes --.
Line 21, "standby" should read -- standing by --.

Column 22,
Line 50, "that" should be deleted.

Column 23,
Line 14, "job" should read -- the job --.

Column 24,
Line 47, "stray" should read -- tray --.

Column 27,
Line 19, "a job" should read -- for a job --.

Column 29,
Line 50, "is" should read -- are --.
Line 54, "said" should read -- said information processor --.

Column 31,
Line 61, "ajob" should -- a job --.

Column 32,
Line 43, "step" should read -- steps --.

Column 33,
Lines 16 and 20, "to" should read -- according to --.
Lines 21 and 25, "is" should read -- are --.

UNITED STATES PATENT AND TRADEMARK OFFICE
CERTIFICATE OF CORRECTION

PATENT NO. : 6,785,727 B1
DATED : August 31, 2004
INVENTOR(S) : Masahito Yamazaki It is certified that error appears in the above-identified patent and that said Letters Patent is hereby corrected as shown below:

<u>Column 35,</u>
Line 16, "is" should read -- are --.

Signed and Sealed this

Thirtieth Day of November, 2004

JON W. DUDAS
*Director of the United States Patent and Trademark Office*